(12) United States Patent
Yiannios

(10) Patent No.: US 10,299,493 B2
(45) Date of Patent: May 28, 2019

(54) DIETARY SUPPLEMENT COMPOSITIONS WITH ENHANCED DELIVERY MATRIX, GUMMIES, CHOCOLATES, ATOMIZERS AND POWDERS CONTAINING SAME, AND METHODS OF MAKING SAME

(71) Applicant: James John Yiannios, Placenta, CA (US)

(72) Inventor: James John Yiannios, Placenta, CA (US)

( * ) Notice: Subject to any disclaimer, the term of this patent is extended or adjusted under 35 U.S.C. 154(b) by 0 days.

(21) Appl. No.: 15/475,636

(22) Filed: Mar. 31, 2017

(65) Prior Publication Data

US 2017/0202238 A1 Jul. 20, 2017

Related U.S. Application Data

(63) Continuation of application No. 15/414,877, filed on Jan. 25, 2017, which is a continuation-in-part of application No. 14/132,486, filed on Dec. 18, 2013, now Pat. No. 9,585,417.

(60) Provisional application No. 61/837,414, filed on Jun. 20, 2013.

(51) Int. Cl.
| | |
|---|---|
| A23G 1/42 | (2006.01) |
| A23G 3/36 | (2006.01) |
| A23G 3/48 | (2006.01) |
| A23G 3/54 | (2006.01) |
| A23L 33/10 | (2016.01) |
| A23L 33/15 | (2016.01) |

(52) U.S. Cl.
CPC .............. *A23G 3/368* (2013.01); *A23G 1/42* (2013.01); *A23G 3/36* (2013.01); *A23G 3/364* (2013.01); *A23G 3/48* (2013.01); *A23G 3/54* (2013.01); *A23L 33/10* (2016.08); *A23L 33/15* (2016.08); *A23V 2002/00* (2013.01)

(58) Field of Classification Search
CPC . A23G 3/368; A23G 3/36; A23G 3/48; A23G 1/42; A23G 3/364; A23G 3/54; A23V 2002/00; A23L 33/10; A23L 33/15
See application file for complete search history.

(56) References Cited

U.S. PATENT DOCUMENTS

| | | | |
|---|---|---|---|
| 5,120,561 A * | 6/1992 | Silva | A21D 2/32 426/531 |
| 5,128,139 A | 7/1992 | Brown et al. | |
| 5,891,465 A * | 4/1999 | Keller | A61K 9/0043 424/43 |
| 7,030,203 B2 | 4/2006 | Mosbey et al. | |
| 7,300,670 B2 * | 11/2007 | Venus | A61K 9/0095 424/400 |
| 8,026,327 B2 | 9/2011 | Mosbey et al. | |
| 8,147,869 B2 | 4/2012 | Guilford et al. | |
| 8,282,977 B2 | 10/2012 | Bromley | |
| 8,337,931 B2 | 12/2012 | Bromley | |
| 2003/0109575 A1 * | 6/2003 | Lambert | A61K 9/0019 514/458 |
| 2005/0142124 A1 | 6/2005 | Kaiser | |
| 2006/0099244 A1 * | 5/2006 | Guilford | A61K 9/127 424/450 |
| 2008/0145502 A1 * | 6/2008 | Vincieri | A23D 7/0053 426/545 |
| 2009/0317532 A1 * | 12/2009 | Bromley | A23L 33/11 426/590 |
| 2012/0149761 A1 | 6/2012 | Quay | |
| 2012/0277316 A1 * | 11/2012 | Tillman | A61K 9/0095 514/547 |
| 2013/0287899 A1 | 10/2013 | Rifkin | |

OTHER PUBLICATIONS

Glutasome. Glutasome (TM). 2012. [retreived on Oct. 9, 2014]. Retrieved from the Internet. <URL:http"www.glutasome.com/>entire document.

Zeolife. An Acute Toxicity Study of Glutasome by Oral Gavage in Rats. pp. 1-59, 2012. [retrieved on Oct. 9, 2014]. Retrieved from the Internet.<URL: http://zeolife.com/newsite/sites/default/files/Summary_Trials.pdf>. p. 43.

Search History: Limited Classification Search, dated Sep. 12, 2014, from corresponding International Patent Application PCT/US2014/043121.

* cited by examiner

*Primary Examiner* — Snigdha Maewall
(74) *Attorney, Agent, or Firm* — Carrier Blackman & Associates, P.C.; Fulchand P. Shende; Joseph P. Carrier

(57) ABSTRACT

A method of making dietary supplement compositions includes generating an aqueous phase (A1) having one or more dietary supplement nutrients (DSN1), generating an oil phase (O1), performing a first homogenizing step by mixing A1 and O1 thereby forming A1/O1 composition, performing a second homogenizing step by mixing the A1/O1 composition and the further added DSN2, performing a third homogenizing step by mixing the A1/O1/DSN2 composition and a first flavor (F1), performing a fourth homogenizing step by mixing the A1/O1/DSN2/F1 composition and a gum dispersed with glycerin (GG), and performing a fifth homogenizing step by mixing the A1/O1/DSN2/F1/GG composition and the second flavor (F2) thereby forming dietary composition A1/O1/DSN2/F1/GG/F2. The A1/O1/DSN2/F1/GG/F2 composition is dispersion in which actives are incorporated in liposomal vesicles which may have a barrier coating of a polymer. A method of making gummies includes surrounding A1/O1/DSN2/F1/GG/F2 composition (inner portion) with an outer portion formed of shell syrup.

14 Claims, 17 Drawing Sheets

DIETARY SUPPLEMENT COMPOSITIONS WITH ENHANCED DELIVERY MATRIX, GUMMIES, CHOCOLATES, ATOMIZERS AND POWDERS CONTAINING SAME, AND METHODS OF MAKING SAME

CROSS-REFERENCE TO RELATED APPLICATIONS

The present application is a continuation of the U.S. patent application Ser. No. 15/414,877, filed on Jan. 25, 2017, which is a continuation-in-part of the U.S. patent application Ser. No. 14/132,486, filed on Dec. 18, 2013, which claims priority under 35 USC 119 based to U.S. Provisional Patent Application No. 61/837,414, filed on Jun. 20, 2013. The entire subject matter of these priority documents, including specification claims and drawings thereof, is incorporated by reference herein.

BACKGROUND OF THE INVENTION

1. Field of the Invention

The present invention relates to dietary supplement compositions in which active ingredients are incorporated in liposomal vesicles which may be physically coated and/or surrounded by a polymer, including biopolymers, for prolonging circulatory time of dietary supplemental compositions in bloodstream of humans and animals when ingested, and to methods of making the same. More particularly, the present invention relates to dietary supplement compositions in which active ingredients are incorporated in liposomal vesicles which may be coated and/or surrounded by one of polymer of ethylene oxide, e.g., polyethylene glycol, a biopolymer, e.g., fenusterol derived from fenugreek seeds, chitosan derived from marine life, such as shrimp, crabs, and a combination thereof; to gummies, chocolates, tablets, sprays/atomizers, capsules, powders having such dietary supplement compositions incorporated therein, and to methods of making the same.

2. Background

For decades, the absorption of dietary supplements, e.g., nutrients, including vitamins and minerals has remained controversial and a matter of considerable investigation. A nutrient is a component used for surviving and growing of humans and animals. It is generally known that when vitamins and mineral pills, or nutritional supplements in liquid or powder forms are ingested, only a fraction of the stated dose on the label of these products is actually absorbed. Thus, mega-doses of certain vitamins may only be conveying conventional doses. It appears that so much of the product may be lost when phagocytes begin attacking the digestive system. The phagocytes cells may perceive nutrient supplements to be foreign invaders. In other words, a stated dose of a dietary supplement may have very little bioavailability.

Further, there are known nutrient gummies (vitamins and minerals gummy bears) mainly for children. However, when the gummies are ingested, nutrients included in the gummies are not designed to be present in bloodstream for an extended period of time so as to increase bioavailability thereof.

Also, there are known tablets and capsules including one or more nutrients. However, such tablets and capsules once ingested may release the nutrients in the bloodstream immediately or within a short period of time thereby depriving bioavailability thereof for longer, extended time periods.

Also, there are atomizers/spray including nutrients. However, again, such nutrient from atomizers when ingested may not stay for a for longer, extended time periods so as to increase bioavailability thereof.

Further, there are nutrient powders. However, such powders once ingested may release the nutrients in the bloodstream immediately or within a short period of time thereby depriving bioavailability thereof for longer, extended time periods.

Accordingly, there is a need to make dietary supplements which are sustained in bloodstreams for extended time periods thereby providing increased bioavailability of the nutrients such as vitamins and minerals.

The present invention has been made to overcome the drawbacks of the existing dietary supplement compositions and methods of making the dietary supplement compositions. Accordingly, it is one of the objects of the present invention to provide dietary supplements with enhanced delivery matrix and having increased bioavailability, and methods of making the same. According to the present invention, an example of dietary supplement composition includes one or more active nutrients, such as vitamins, minerals, antioxidants (e.g., reduced glutathione).

SUMMARY OF THE INVENTION

In order to achieve the above objects, the present invention provides dietary supplement compositions.

According one aspect of the present invention, a dietary supplement composition has a dispersion including a plurality of liposomal vesicles. The dietary supplement composition includes an active ingredient including one or more dietary supplement nutrients (DSN); phospholipid contained in the liposomal vesicles; and a coating material. The phospholipid includes sunflower lecithin. The active ingredient is incorporated within the liposomal vesicles. The coating material is free flowing in the dispersion such that the liposomal vesicles are surrounded by the coating material without being attached to the liposomal vesicles and without forming part of the liposomal vesicles and without affecting weight of liposomal vesicles. The dispersion is filtered using a tangential flow technique, which washes out outer periphery of liposomal vesicles so as to remove inactive ingredients contained outside the liposomal vesicles without washing out the coating material surrounding the liposomal vesicles.

The active ingredient is one of curcumin, reduced glutathione (GSH), vitamin A, vitamin B1 (thiamine), vitamin B2 (riboflavin), vitamin B3 (niacin), vitamin B5 (pantothenic acid), vitamin B6 (pyridoxine), vitamin B7 (biotin), vitamin B9 (folic acid), vitamin B12 (cobalamin), vitamin C (ascorbic acid), vitamin D, vitamin E, vitamin K, trace mineral iron, trace mineral zinc, trace mineral iodine, trace mineral copper, trace mineral manganese, trace mineral fluoride, trace mineral chromium, trace mineral selenium, trace mineral molybdenum, and trace mineral boron, and a combination thereof. Here, the phrase "combination thereof" means two or more of these nutrients. The active ingredient may include additional dietary supplement nutrients not listed above.

The coating material is one of a biopolymer including saponin rich fraction obtained from fenugreek seeds, a polyethylene glycol (PEG) identified with Registry Number 25322-68-3 in the Chemical Abstract Service of the American Chemical Society, chitosan, and a combination thereof. The phrase "combination thereof" means PEG and biopolymer, or PEG and chitosan, or biopolymer and chitosan, or PEG, biopolymer and chitosan.

The dietary supplement composition may further include cyclodextrin-a and cyclodextrin-c for countering (masking) fowl, unpleasant smell or taste of active ingredient. The cyclodextrin-a and cyclodextrin-c also provide heat shield to the actives in while preparing gummies which includes inner portion having the dietary supplement composition, and an outer portion formed of edible material and including active ingredients.

The dietary supplement composition may be incorporated in gummies, chocolates, atomizers or powders. The powders reconstitute liposomes containing active ingredients when dissolved in water.

According another aspect of the present invention a dietary supplement composition is a dispersion including a plurality of liposomal vesicles. The dietary supplement composition includes an active ingredient including one or more dietary supplement nutrients (DSN); and phospholipid contained in the liposomal vesicles. The phospholipid includes sunflower lecithin. The active ingredient is incorporated within the liposomal vesicles. The dispersion is filtered using a tangential flow technique, which washes out outer periphery of liposomal vesicles so as to remove inactive ingredient contained outside the liposomal vesicles. Such dietary supplement composition does not include a coating material, i.e., the liposomal vesicles are not surrounded by the coating material. The active ingredient is one of curcumin, reduced glutathione, vitamin A, vitamin B1 (thiamine), vitamin B2 (riboflavin), vitamin B3 (niacin), vitamin B5 (pantothenic acid), vitamin B6 (pyridoxine), vitamin B7 (biotin), vitamin B9 (folic acid), vitamin B12 (cobalamin), vitamin C (ascorbic acid), vitamin D, vitamin E, vitamin K, trace mineral iron, trace mineral zinc, trace mineral iodine, trace mineral copper, trace mineral manganese, trace mineral fluoride, trace mineral chromium, trace mineral selenium, trace mineral molybdenum, and trace mineral boron, and a combination thereof. Here, the phrase "combination thereof" means two or more of these nutrients. The active ingredient may include additional nutrients not listed above.

The dietary supplement composition may further include cyclodextrin-a and cyclodextrin-c for countering (masking) fowl, unpleasant smell or taste of active ingredient. The cyclodextrin-a and cyclodextrin-c also provide heat shield to the actives in while preparing gummies which includes inner portion having the dietary supplement composition, and an outer portion formed of edible material including the active ingredients.

The dietary supplement composition may be incorporated in gummies, chocolates, atomizers or powders. The powders reconstitute liposomes when dissolved in water.

The methods of making few dietary supplements compositions are discussed below.

The method steps of making dietary supplement without polymer (e.g., Curcumin-C without polymer, Curcumin-C is a mix of mainly curcumin and vitamin C) includes (1) preparing aqueous phase, (2) preparing oil phase with emulsifier, and (3) mixing/homogenizing the aqueous and oil phases. The following steps are summarized for Curcumin-C without polymer (described with reference to FIGS. 1-3). It may be noted that Curcumin-C, which mainly includes curcumin and vitamin C as active ingredients, may be replaced with or combined with other nutritional substances such as reduced glutathione and other types of actives used in dietary supplement nutrition.

The method steps for generating/preparing an aqueous phase (A1) include
- dissolving *stevia* (having all natural flavors such as pineapple and orange flavors incorporated therein) in 5% w/w of hot purified water at about 55° C. based on a total weight of the *stevia*, so as to form Subcomposition-I (STEP C1),
- dissolving a first measurement of curcumin mix (curcumin, piperic acid, sodium ascorbate, ascorbic acid blend that includes citrus bioflavonals) (CM1) in sufficient amount of hot purified water at a temperature not more than 65° C., so as of form Subcomposition-II (STEP C2),
- adding and/or mixing Subcomposition-I to Subcomposition-II, so as to form Subcomposition-III (STEP C3);
- adding and/or mixing surfactant/emulsifier and citric acid to Subcomposition-III, so as to form Subcomposition-IV (STEP C4);
- thereafter, stirring Subcomposition-IV for a predetermined time period, e.g., for 2 minutes, so as to form Subcomposition-V (STEP C5);

The method steps for generating an Oil Phase (O1) include:
- mixing phospholipids/phospholipids fraction (e.g., sunflower lecithin) and mixed tocopherols together under 65° C. (STEP C6); and
- stirring mix of phospholipids/phospholipids fraction and mixed tocopherols for 2 minutes so as to form a Subcomposition-VI, i.e., an oil phase (STEP C7).

The further steps for preparing dietary supplement composition of a Curcumin-C without polymer include:
- adding/mixing the Subcomposition-V (A1) and the Subcomposition-VI (O1) into in a Stainless Steel vessel (STEP C8);
- performing first homogenizing step by mixing the A1 and O1 at 1,000 rpm progressively increasing to 5,000 rpm for a first predetermined time period (e.g. 30 minutes) using a high-shear homogenizer, so as to form an A1/O1 composition (Subcomposition-VII) (STEP C9);
- adding and/or mixing a second measurement of curcumin mix (CM2) to the aqueous-oil composition (STEP C10), this step is optional depending on if there is loss of curcumin and vitamin C in the previous steps;
- performing second homogenizing step by mixing CM2 and the A1/O1 composition for a second predetermined time period (e.g., not less than 10 minutes) at 1,000 rpm progressively increasing to 5,000 rpm at not more than 65° C., so as to form an A1/O1/CM2 composition (Subcomposition-VIII) (STEP C11);
- adding first flavor (F1) including an oil phase flavor to the A1/O1/CM2 composition (STEP C12);
- performing third step of homogenizing A1/O1/CM2 composition and F1 for a third predetermined time period (e.g., 3-5 minutes) at 1,000 rpm progressively increasing to 5,000 rpm at not more than 65° C., so as to form an A1/O1/CM2/F1 composition (Subcomposition-IX) (STEP C13);
- adding Gum arabic dispersed along with balance quantity of 50% glycerin (GG) to A1/O1/CM2/F1 composition (STEP C14);
- performing fourth step of homogenizing a final liquid, i.e., mixture of A1/O1/CM2/F1 composition and GG for a fourth predetermined time period (e.g., 10 minutes) at 1,000 rpm progressively increasing to 5,000 rpm at not more than 65° C., so as to form an A1/O1/CM2/F1/GG composition (Subcomposition-X) (STEP C15);

adding a second flavor (F2) including an aqueous phase flavor to the A1/O1/CM2/F/GG composition (STEP C16); and making up the weight to 100% with purified water under constant stirring, i.e., by performing fifth step of homogenizing by mixing the A1/O1/CM2/F1/GG composition and the F2 for a fifth predetermined time period (e.g., 3-5 minutes) using the high shear homogenizer rotated at 1,000 rpm progressively increasing to 3,500 rpm at not more than 65° C., so as to form an A1/O1/CM2/F1/GG/F2 composition (Subcomposition-XI) (STEP C17); and allowing flavors to mature for 6 hours in the A1/O1/CM2/F1/GG/F2 composition, so as to form Subcomposition-XII (STEP C18);

subsequently, nitrogen-flushing a final liquid, i.e. the A1/O1/CM2/F1/GG/F2 composition (STEP C19); and finally, spray drying the A1/O1/CM2/F1/GG/F2 composition (STEP C20) and placing/storing the spray dried A1/O1/CM2/F1/GG/F2 composition in a well labeled and sealed container.

In this manner Curcumin-C without polymer (aqueous-oil-curcumin mix-first-flavor-gum-second-flavor composition) is produced. If the dietary supplement Curcumin-C is to be used in gummy bears, then last method Step C20 is not performed so that the dietary supplement Curcumin-C, A1/O1/CM2/F1/GG/F2 composition, remains in gel form.

The Curcumin-C is a composition in a dispersion in which the curcumin mix is incorporated within the liposomal vesicles. The Curcumin-C dispersion may be filtered using a tangential flow technique (discussed herein) which washes out outer periphery of liposomal vesicles so as to remove inactive ingredient contained outside the liposomal vesicles.

The method steps for another composition, i.e., Curcumin-C with polymer, are summarized below (described with reference to FIGS. 4-6). The method steps of making Curcumin-C with polymer includes (1) preparing aqueous phase, (2) preparing oil phase with emulsifier, and (3) mixing/homogenizing the aqueous and oil phases. It may noted that Curcumin-C may be replaced with other nutrients such as reduced glutathione (GSH). Curcumin-C with polymer is a variation of the Curcumin-C without polymer in that the Curcumin-C with polymer includes barrier coating a polymer around and/or between liposomal vesicles having Curcumin-C incorporated therein. The polymer may be one of PEG, a biopolymer (e.g., derived from fenugreek seeds), chitosan, and a combination thereof. Such polymer coating provides extra strength to liposomal vesicles filled with Curcumin-C.

The method steps for generating an aqueous phase (A1) include:

dissolving *stevia* in 5% w/w of hot purified water at about 55° C. based on a total weight of the *stevia*, so as to form Subcomposition-I (STEP CP1), all natural flavors such as pineapple and orange flavors are incorporated with *stevia*;

dissolving a first measurement of curcumin mix (curcumin, piperic acid, sodium ascorbate, ascorbic acid blend that includes citrus bioflavonals) (CM1) in sufficient amount of hot purified water at a temperature not more than 65° C., so as of form Subcomposition-II (STEP CP2), adding and/or mixing Subcomposition-I to Subcomposition-II, so as to form Subcomposition-III (STEP CP3);

adding and/or mixing surfactant/emulsifier (e.g., TWEEN-80) and/or citric acid to Subcomposition-III, so as to form Subcomposition-IV (STEP CP4);

thereafter, stirring Subcomposition-IV for a predetermined time period, e.g., for 2 minutes, so as to form Subcomposition-V (STEP CP5);

dissolving a polymer in 2% w/w of hot water at not less than 45° C. based on total weight of the polymer, and adding 50% amount of glycerin by weight to it, and adding and cyclodextrin-a and cyclodextrin-c up to 3% by mass of the CM1 under stirring and mix together well for not more than 10 minutes so as to form Subcomposition-VI (STEP CP6); in this Step CP6, polymer may be a PEG, a biopolymer, chitosan, and a combination thereof; and adding and/or mixing Subcomposition V with Subcomposition-VI, so as to form Subcomposition-VII, i.e., A1 phase (STEP CP7).

As shown in FIG. 5, the method steps for generating an Oil Phase with Emulsifier (O1) include:

mixing phospholipids/phospholipids fraction (e.g., sunflower lecithin) and mixed tocopherols together under 65° C. (STEP CP8); and stirring mix of phospholipids/phospholipids fraction and mixed tocopherols for 2 minutes so as to form a Subcomposition-VIII, i.e., O1 phase (STEP CP9).

The further steps for preparing a Curcumin-C with polymer include:

adding/mixing the Subcomposition-VII (A1) and the Sub-composition-VIII (O1) into in a Stainless Steel vessel (STEP CP10);

performing first homogenizing step by mixing the A1 and O1 at 1,000 rpm progressively increasing to 5,000 rpm for a first predetermined time period (e.g. 30 minutes) using a high-shear homogenizer, so as to form an A1/O1 composition (Subcomposition-IX) (STEP CP11);

adding and/or mixing a second measurement of curcumin mix (CM2) to the aqueous-oil composition (STEP CP12), this step is optional based on whether there is any loss of curcumin mix in the previous steps;

performing second homogenizing step by mixing CM2 and the A1/O1 composition for a second predetermined time period (e.g., not less than 10 minutes) at 1,000 rpm progressively increasing to 5,000 rpm at not more than 65° C., so as to form an A1/O1/CM2 composition (Subcomposition-X) (STEP CP13);

adding first flavor (F1) including an oil phase flavor to the A1/O1/CM2 composition (STEP CP14);

performing third step of homogenizing A1/O1/CM2 composition and the F1 for a third predetermined time period (e.g., 3-5 minutes) at 1,000 rpm progressively increasing to 5,000 rpm at not more than 65° C., so as to form an A1/O1/CM2/F1 composition (Subcomposition-XI) (STEP CP15);

adding Gum arabic that is dispersed along with balance quantity of 50% glycerin (GG) to A1/O1/CM2/F1 composition (STEP CP16);

performing fourth step of homogenizing a final liquid, i.e., mixture of A1/O1/CM2/F1 composition and GG for a fourth predetermined time period (e.g., 10 minutes) at 1,000 rpm progressively increasing to 5,000 rpm at not more than 65° C., so as to form an A1/O1/CM2/F1/GG composition (Subcomposition-XII) (STEP CP17);

adding a second flavor (F2) including an aqueous flavor to A1/O1/CM2/F1/GG composition (STEP CP18); and making up the weight to 100% with purified water under constant stirring, i.e., by performing fifth step of homogenizing by mixing the A1/O1/CM2/F1/GG composition and the second flavor for a fifth predetermined time period (e.g., 3-5 minutes) using the high shear homogenizer rotated at 1,000 rpm progressively increasing to 3,500 rpm at not more than 65° C., so as to form an A1/O1/CM2/F1/GG/F2 composition (Sub-composition-XIII) (STEP CP19); and allowing flavors to maturate for 6 hours in the aqueous-oil-curcumin mix-first-flavor-gum-second-flavor composition, so as to form Subcomposition-XIV (STEP CP20);

subsequently, nitrogen-flushing a final liquid, i.e. the aqueous-oil-curcumin mix-first-flavor-gum-second-flavor composition (STEP CP21); and further, spray drying the aqueous-oil-curcumin mix-first-flavor-gum-second-flavor composition and placing/storing the spray dried composition in a well labeled and sealed container (STEP CP22).

In this manner, the Curcumin-C with polymer (aqueous-oil-curcumin mix-first-flavor-gum-second-flavor composition) is produced. If the dietary supplement Curcumin-C is to be used in gummy bears or chocolates, then last method step C22 is not performed so that the dietary supplement Curcumin-C with polymer remains in gel form.

The Curcumin-C with polymer is a composition in a dispersion in which the Curcumin mix is incorporated within the liposomal vesicles. The Curcumin-C dispersion may be filtered using a tangential flow technique which washes out outer periphery of liposomal vesicles so as to remove inactive ingredient contained outside the liposomal vesicles. The tangential flow technique is discussed herein. The tangential flow does not wash out or remove polymer coating surrounding the liposomal vesicles.

The dietary supplement compositions such as those discussed herein are incorporated in gummies, chocolates, tablets, capsules, sprays/atomizers and powders. The dietary supplement compositions in powder form reconstitute liposomes when dissolved in water.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
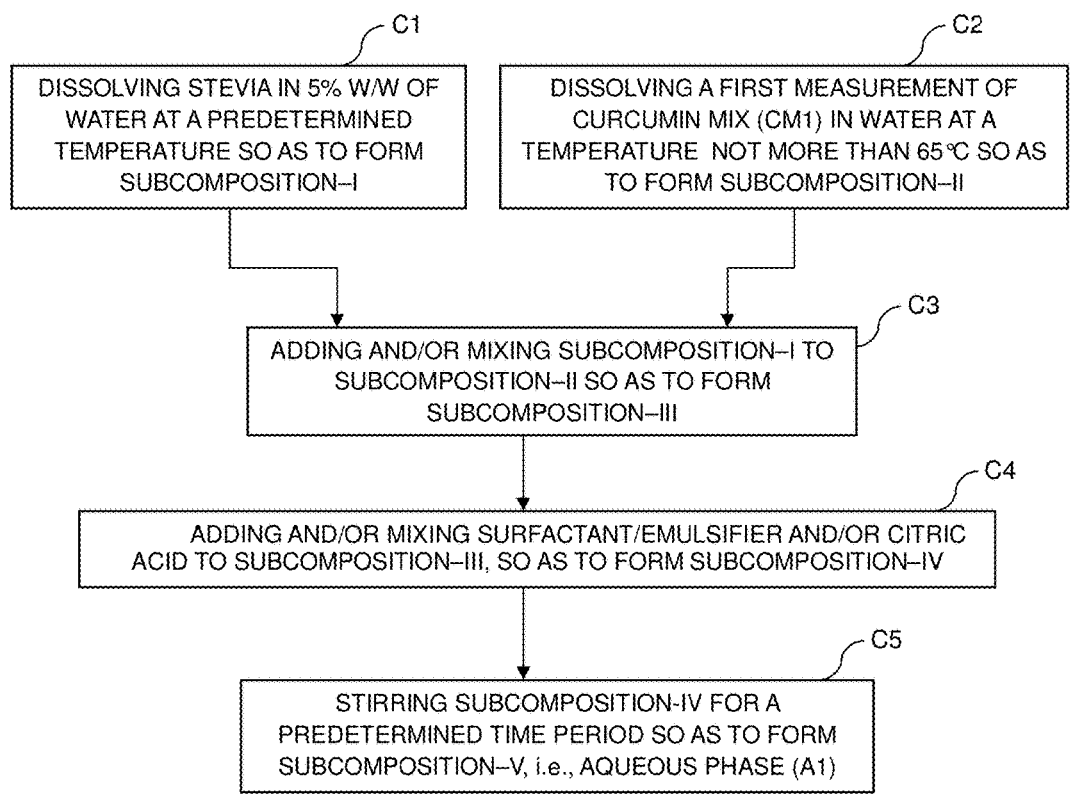
FIG. 1 is a flowchart showing method steps of generating an aqueous phase for Curcumin-C without polymer according to an illustrative embodiment of the present invention.

The present invention provides dietary supplement compositions, which may be in a liquid, gel or powder form. One or more of active nutritional ingredients such as curcumin, reduced glutathione, vitamin A, vitamin $B_1$ (thiamine), vitamin $B_2$ (riboflavin), vitamin $B_3$ (niacin), vitamin $B_5$ (pantothenic acid), vitamin $B_6$ (pyridoxine), vitamin $B_7$ (biotin), vitamin $B_9$ (folic acid), vitamin $B_{12}$ (cobalamin), vitamin C (ascorbic acid), vitamin D, vitamin E, vitamin K, trace mineral iron, trace mineral zinc, trace mineral iodine, trace mineral copper, trace mineral manganese, trace mineral fluoride, trace mineral chromium, trace mineral selenium, trace mineral molybdenum, and trace mineral boron, etc. are incorporated in a distinctive matrix. Such matrix facilitates efficient oral intake and absorption of powerful nutrients including antioxidants into a human body or an animal body for an extended time period. The active ingredients such as sodium ascorbate and ascorbic acid, and reduced glutathione are incorporated, i.e., enclosed in liposomal vesicles of phospholipids. The liposomal vesicles may covered by providing a free flowing barrier coating a polymer including one of PEG, a biopolymer (derived from fenugreek seeds), chitosan, and a combination thereof. The polymer provides a physical barrier coating to the liposomal vesicles.

In other words, the polymer acts as a liner to liposomal vesicles. However, polymer is not attached to the liposomal vesicles. The liposomal vesicles may be of various sizes and shapes. Generally, the liposomal vesicles are about 40-400 μm in diameter. Various flavors, such as oil phase flavors and aqueous phase flavor, may be added to the dietary supplement compositions. Generally, the dietary supplement compositions may include one or more of oil phase flavor such as a citrus flavor, and aqueous phase flavor such as a pineapple flavor, a watermelon flavor. The dietary supplement may also include polysaccharide, such as gum arabic, and glycerin.

Materials Used

In the following paragraphs various materials used are briefly disclosed. The list is not extensive and does not include all the materials used in the present invention.

Polymers

A polymer is a substance that has a molecular structure consisting mainly a large number of similar units bonded together. The polymer may be synthetic or naturally occurring. The polymer may be a biopolymer, such as, one derived from fenugreek seeds, which may be useful for vegan people. Polymers coating to liposomal vesicles provides extra strength to liposomal vesicles filled with nutritional ingredients so to sustain them in a blood stream for an extended time period.

Polyethylene Glycol (PEG)

In the dietary supplement compositions of the present invention, a suitable polymer such as PEG may be used as a barrier coating for liposomal vesicles (liposomes). The PEG provides free form, linear coating to the liposomal vesicles. The molecular weight of the PEG is range of 400 Da to 20,000 Da in the formulation. The PEG only occupies the space between the liposomes. The PEG is not attached to liposomes via a covalent bond. In other words, the PEG does not form part of the liposomes. Since the PEG does not form part of liposomes, the amount of its addition in the composition can easily be varied. The PEG used in the dietary supplement compositions of the present invention is known as Carbowax 400, which has two free —OH ends as shown in the following illustration. The PEG is listed in the Chemical Abstract Service (CAS) of the American Chemical Society, and identified as CAS Registry Number 25322-68-3. It belongs to chemical family of Oxyalkylene Polymer. It has CFTA nomenclature—PEG-8.

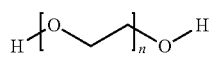

The PEG used in the present invention has an average molecular weight: 380-420 g/mole. It has colorless, odorless liquid appearance due to its low toxicity. It has a range of average hydroxyl number, mg 264-300 KOH/g. It has density of 1.1255 g/cm$^3$ at a temperature of 20° C., and melting or freezing range of 4 to 8 C. It is completely soluble in water at a temperature of 20° C. Its viscosity is 7.3 cST at a temperature of 100° C. It has 8.7 units average number of repeating oxyethylene. It has average liquid specific heat of 0.51 cal/g/° C., and heat of fusion of 36 Cal/g. Its pH is 4.5-7.5 at 25° C. in 5% aqueous solution. Its flash point, pensky martens closed cup is 227° C. Its flash point, Cleveland Martens Closed Open Cup is 263° C. Its weight is 9.39 lbs/gal at a temperature of 20° C.

Biopolymers

As a substitute to PEG or in combination with PEG, one or more suitable biopolymers may be used as a coating material for providing coating to liposomal vesicles. Such biopolymers may include saponins or fractions thereof, which are compounds found in various plant species. Saponins may form soap-like foaming when shaken in aqueous solutions.

Saponin Rich Fractions

In the present invention, one or more of saponin rich fractions obtained from fenugreek seeds are used. It may be noted that fenugreek seeds, also known as *Trigonella foenum-graecum*, are good plant-based source of saponins. Each saponin includes sapogenin formed of aglycon moiety of the molecule, and a sugar. The sapogenin may be a steroid or a triterpene and the sugar moiety may be glucose, galactose, pentose or a methylpentose. The fenugreek seeds have been found to contain several different saponins, such as diosgenin and its isomers yamogenin, gitogenin and tigogenin. The other furostanols may include smilagenin, sarsasapogenin, neotigenin, yuccagenin, lilagenin and neogitogenin. In the present invention, a saponin rich fraction obtained from Fenugreek seeds (for example, Fenusterol® manufactured by Sabinsa Corporation, 750 S. Innovation Circle, Payson, Utah 84651) is used.

Chitosan

Chitosan is a biopolymer. It is a linear polysaccharide. It is found mainly in the exoskeleton of marine animals such as shrimp, crabs, or lobsters. It is generally made by treating the chitin shells of shrimp and other crustaceans with an alkaline substance, e.g., sodium hydroxide.

Phospholipids

Phospholipids are lipids which form cell membranes. Phospholipids form lipid bilayers since they are amphiphilic. Phospholipids include hydrophobic fatty acid tails and a hydrophilic head, joined together by a glycerol molecule. Lecithins are usually phospholipids including phosphoric acid with choline, glycerol or other fatty acids such as glycolipids or triglyceride. In the present invention, lecithin in sunflower (*helianthus annuus*) seed oil (sunflower lecithin) is used. The lecithin has phospholipid fraction with typically 35% phosphatidylcholine and other phospholipids in a sunflower oil based carrier system. Generally, in its natural form, it is gold yellow to brown color. It is a maximum viscosity of 7,000 mPas at a temperature of 25° C. However, other suitable phospholipids may be used.

Lecithins

Lecithins, which are generally used as emulsifiers, are prepared by extracting and purifying phospholipids from naturally occurring products such as soybeans, eggs, sunflower and canola seeds. Lecithins have different affinities for oil and water thus making them amphiphilic. The simultaneous hydrophilic (water-loving) and hydrophobic (water-repelling) properties of lecithins enable them to make stable blends of materials that otherwise do not mix easily and tend to separate. Lecithins are helpful for dispersing and suspending powders into liquids, controlling the viscosity of liquids and semi-liquids, preventing foods from sticking to contact surfaces, and preventing adhesion of food products to one another.

Lecithins contain phospholipids, such as phosphatidylcholine (PC), phosphatidylserine (PS) and derivatives such as glycero-phosphocholine (alpha-GPC) are known to be beneficial to the function of the liver, brain, heart, and other organs of humans.

The phospholipids composition in a typical soybean-based liquid lecithins is: phosphatidylcholine (PC, 14-16%); phosphatidylethanolamine (PE, 10-15%); phosphatidylinositol (PI, 10-15%); and phosphatidic acid (PA, 5-12%).

Glycerin

Glycerin is a polyol, i.e., a sugar alcohol compound. It is a sweet-tasting colorless, odorless and viscous liquid. It may be used as a sweetener and/or as a hygroscopic substance. It can be either synthetic or plant based.

Reduced Glutathione (GSH)

Glutathione is a tripeptide containing a free thiol group. Glutathione exists in the body in two forms, a reduced form (reduced glutathione, GSH) and an oxidized form. Human bodies constantly produce free radical molecules as a byproduct of metabolism. The GSH is an antioxidant that protects cells and tissues by scavenging free radicals. In this process, GSH is transformed into the oxidized form. However, GSH can quickly be depleted under heavy bouts of free radical stress or exposure to compounds that require detoxification. A shift in the ratio towards the oxidized state leaves cells and tissues vulnerable to free radical damage and inflammation. Thus, there is a need to prolong release of dietary supplement compositions including GSH in bloodstream.

The GSH includes glutamic acid, cysteine, and glycine-covalently joined end-to-end. GSH is crucial for scavenging damaging free radicals. It is also required for the body's natural immune response and is important in the cellular detoxification of damaging chemicals.

Potassium Sorbate

Potassium sorbate is a food preservative. It is potassium salt of sorbic acid. It is a white salt, which has solubility of 58.2% in water at a temperature of 20° C.

Sodium Benzoate

Sodium benzoate is a food preservative. It is the sodium salt of benzoic acid. It can be produced by reacting sodium hydroxide with benzoic acid. Benzoic acid occurs naturally at low levels in cranberries, prunes, greengage plums, cinnamon, ripe cloves, and apples.

Stevia

Stevia is extracted from Stevia rebaudiana. It is generally used as a sugar substitute. It is includes steviol glycosides, e.g., stevioside and rebaudioside. It is generally recognized as safe to consume for people with diabetic issues.

Emulsifiers

Emulsifiers are surfactants which lower interfacial tension between two liquids, or between a liquid and solid material. Commonly used emulsifiers in foods are egg yolk, mustard, soy lecithin is another emulsifier and thickener, sodium phosphates, sodium stearoyl lactylate, and diacetyl tartaric ester of monoglyceride. In the present invention, nonionic surfactant and emulsifier, e.g., polysorbate 80, may be used in combination with citric acid. Alternatively, citric acid alone can be used. The commercial surfactant and emulsifier, e.g., TWEEN 80 is mostly used in compositions which use gel based biopolymers. The TWEEN 80 may not be generally used in the dietary supplement compositions which are spray dried.

Cyclodextrins

Cyclodextrins are oligosaccharides obtained by enzymatic means from starch-containing raw materials such as corn or potatoes. Cyclodextrins are vegetarian-grade and non-allergenic, and do not have an E number. The characteristic feature of cyclodextrin molecules is their ring-shaped, three-dimensional structure, with a hydrophobic cavity in the center, which can receive a lipophilic "guest" molecule—provided its size and shape are compatible its hydrophilic outer surface ensures compatibility with aqueous systems. This allows the applications of cyclodextrins to be utilized for masking bitter tasting substances and stabilizing aromas. Cyclodextrins may be composed of 5 or more α-D-glucopyranoside units linked as 1->4. The cyclodextrins used in the present invention include six and eight units glucose monomers in a ring, i.e., α-cyclodextrin: 6-membered sugar ring molecule (cyclodextrin-a), and γ-cyclodextrin: 8-membered sugar ring molecules (cyclodextrin-c). The cyclodextrins are hydrophobic inside and hydrophilic outside.

The cyclodextrin-a has CAS Number 10016-20-3, its formula is $C_{36}H_{60}O_{30}$ and its weight is 972.84 g/mo. The chemical structure of cyclodextrin-a is shown below.

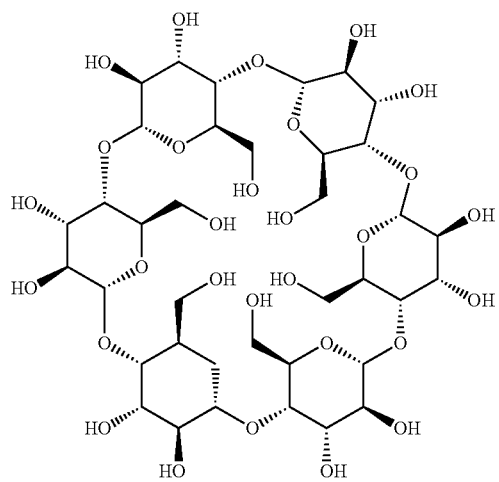 [SMILES: OC[C@H]1C[C@@H]2O[C@H]3[C@@H](O)[C@H](O)[C@@H](O[C@H]4[C@@H](O)[C@H](O)[C@@H](O[C@H]5[C@@H](O)[C@H](O)[C@@H](O[C@H]6[C@@H](O)[C@H](O)[C@@H](O[C@H]7[C@@H](O)[C@H](O)[C@@H](O[C@H]1[C@@H](O)[C@@H]2O)O[C@@H]7CO)O[C@@H]6CO)O[C@@H]5CO)O[C@@H]4CO)O[C@@H]3CO]

The cyclodextrin-c has CAS Number 17465-86-0, its formula is $C_{48}H_{80}O_{40}$ and its weight is 1297.12 g/mo. The chemical structure of cyclodextrin-c is shown below.

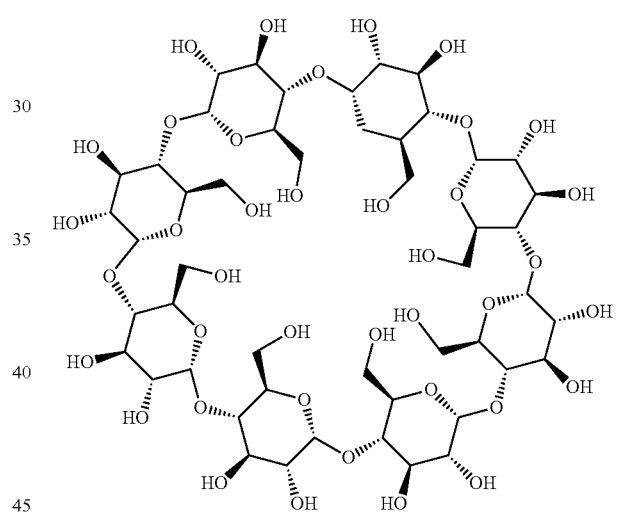

According to the present invention, generally, 3% in equal parts of cyclodextrin-a and cyclodextrin-c of molecular weight of the active ingredient in solution are added.

Pterostilbene

Pterostilbene (trans-3,5-dimethoxy-4-hydroxystilbene) is a naturally derived compound found primarily in blueberries and Pterocarpus marsupium plants. Parts of the plants have long been believed to have medicinal properties in Ayurveda. Substantialevidence suggests that pterostilbene may have numerous preventive and therapeutic properties in a vast range of human diseases that include neurological, cardiovascular, metabolic, and hematologic disorders. Further benefits of pterostilbene have been reported in preclinical trials, in which pterostilbene was shown to be a potent anticancer agent in several malignancies.

The structure of pterostilbene is shown below:

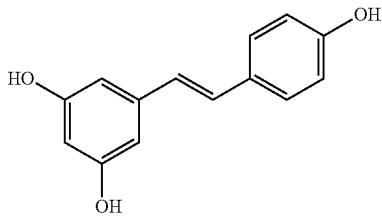 [SMILES: Oc1ccc(/C=C/c2cc(O)cc(O)c2)cc1]

Pterostilbene is structurally similar toresveratrol, a compound found in red wine that has comparable antioxidant, anti-inflammatory, and anticarcinogenic properties; however, pterostilbene exhibits increased bioavailability due to the presence of two methoxy groups which cause it to exhibit increased lipophilic and oral absorption.

Pterostilbene reduces oxidative stress and production of reactive oxygen species, such as hydrogen peroxide and superoxide anion derived polyphenol with antioxidant properties. Pterostilbene possess skin whitening activity because of the anti-oxidant activity. Pterostilbene also acts as a ultraviolet protector against harmful radiations. The higher bioavailability of pterostilbene contributes to many of the health benefits of pterostilbene. The potential anti-bacterial activity of pterostilbene helps to reduce the skin diseases caused by bacteria. It has got higher oral bioavailability and long withstanding capacity in the body, thereby extending its application. Pterostilbene also inhibited melanin formation and inhibited the action of enzyme tyrosinase, which all contributes to the ageing.

Pterostilbene is isolated by solvent extraction of dried wood of Pterocarpus (Pterocarpus marsupium, family: Fabaceae). This is then further purified to obtain powder form.

Curcumin

Curcumin is the principal curcuminoid of turmeric, also known as *curcuma longa*, which is a member of the ginger family (Zingiberaceae). Curcumin has been used in Ayurvedic medicines. Its known identifier is CAS Number:458-37-7. Its Chemical formula is $C_{21}H_{20}O_6$; molar mass is 368.39 $g \cdot mol^{-1}$ and its melting point is 183° C. (361° F.; 456 K).

Curcumin is obtained from Aurea Biolabs (P) Limited Kolenchery, Cochin, Kerala, India 682311. Aurea Biolabs trades curcumin under brand name Acumin. However, curcumin may be obtained from other sources. Curcumin may also be grown locally.

Vitamin C

Vitamin C is ascorbic acid. Vitamin C is water soluble. Vitamin C (Pureway C) is obtained from Innovation Labs Inc., 12901 SW 122nd Ave #102, Miami, Fla. 33186.

Gum Arabic

Gum arabic is a natural gum. It is made of the hardened sap of various species of the acacia tree. It is also known as acacia gum. It is a complex mixture of glycoproteins and polysaccharides. It is edible. It has E number E414.

Tangential Flow Technique

A tangential flow filtration system is a membrane-based filtration for clarifying and concentrating materials in dispersion such as liposomal vesicles. In a tangential flow filtration technique, a fluid (such as, dietary supplement composition, e.g., Curcumin-C dispersion) is pumped tangentially along a surface of a membrane. An applied pressure serves to force a portion of the fluid through the membrane to the filtrate side. Liposomal vesicles (having nutrients incorporated therein) that are too large to pass through the membrane pores are retained on the upstream side. However, the liposomal vesicle (retained components) do not build up at the surface of the membrane. Instead, they are swept along by the tangential flow. The inactive ingredient contained outside the liposomal vesicles (fines size particles) are filtered through the membrane and separated from the liposomal vesicles. The tangential flow filtration system may be used when liposomal vesicles are smaller than the inactive ingredient particles.

Illustrative Methods

The illustrative methods of preparing such dietary supplement compositions generally include (1) preparing aqueous phase, (2) preparing oil phase with emulsifier, and (3) mixing/homogenizing the aqueous and oil phases. The methods are described with respect to various illustrative dietary supplement compositions including one or more nutrients. A nutrient is a component used for surviving and growing of humans and animals. Examples of nutrients are vitamins, minerals, antioxidants, proteins, fats and carbohydrates. The methods described below may be applicable to encapsulating variety of nutrients, such as, e.g., vitamins, minerals, antioxidants, proteins, carbohydrates, fats, in liposomal vesicles.

The method of making the following two illustrative dietary supplement compositions Curcumin-C (which mainly has curcumin and vitamin C as active nutrient ingredients) and Glutasome (which mainly has reduced glutathione and vitamin C as active ingredients) are discussed.

Curcumin-C

Curcumin-C, which mainly includes curcumin and vitamin C as active ingredients, can be made in two different compositions. The first composition, e.g., Curcumin-C without polymer, may include all ingredients free from genetically modified organisms (GMO), that is, all ingredients are Non-GMO ingredients, and non-soy preparation that are free from preservatives. However, if desired, it is possible to use GMO ingredients in combination with non-GMO ingredients. The Curcumin-C is incorporated in liposomal vesicles. In the Curcumin-C without polymer composition, liposomal vesicles are not provided with barrier coating of a polymer. The polymer is one of PEG, a biopolymer (derived from fenugreek seeds), chitosan, and a combination thereof. The phrase 'combination thereof' means PEG and biopolymer; or PEG and chitosan; or biopolymer and chitosan; or PEG, biopolymer and chitosan.

The second composition, herein may be referred as Curcumin-C with Polymer is a variation of the first composition in that it includes barrier coating a polymer around and/or between liposomal vesicles.

It may be noted that both the first and second compositions are designed to be selectively flavored, as desired, such as pineapple and orange incorporated with *stevia* and citric acid, and to allow the liposomal vesicles to reconstitute within the water.

Figure 2:
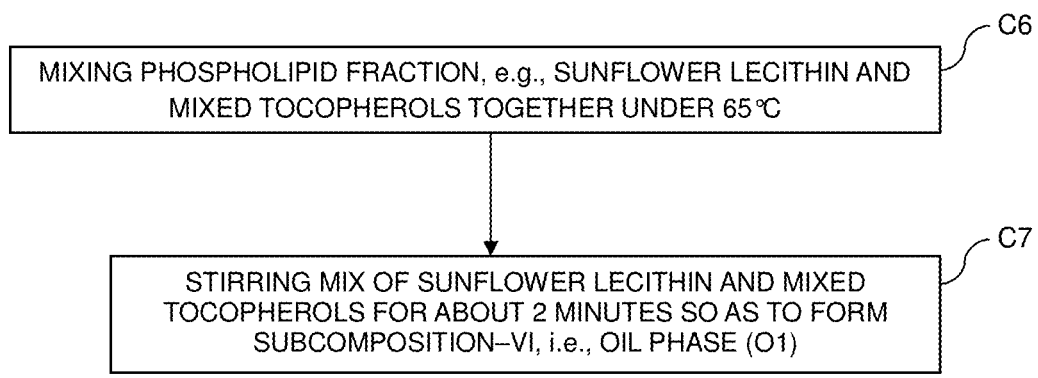
FIG. 2 is a flowchart showing method steps of generating an oil phase for Curcumin-C without polymer.
Figure 3:
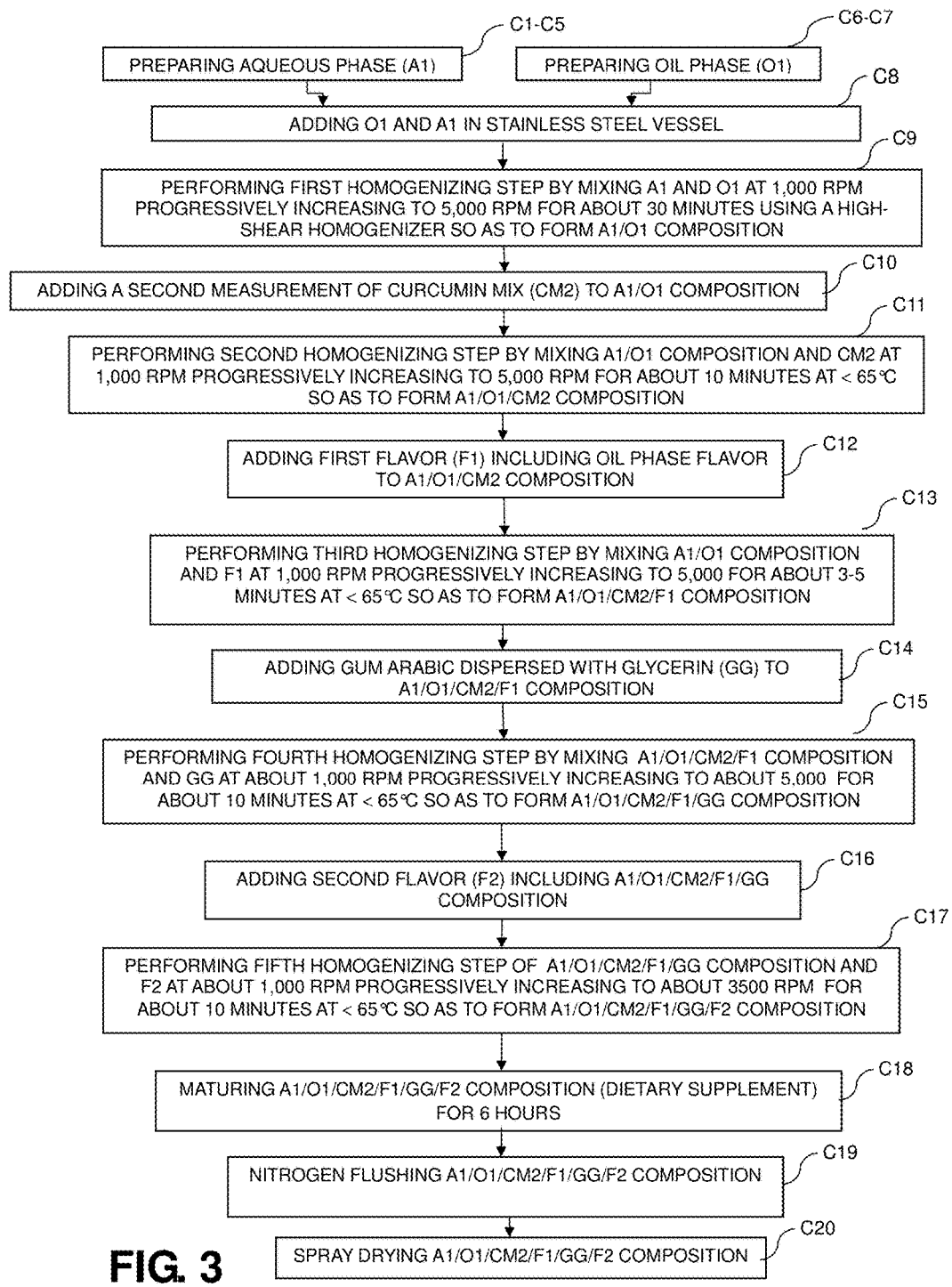
FIG. 3 is flowchart showing steps of preparing Curcumin-C without polymer.

A typical composition of Curcumin-C with or without polymer is as follows:

Curcumin-Acumin (50%)—250 mg
Piperic Acid—3 mg
Pureway-C—150 mg (Vitamin C)
Sunflower Lecithin—500 mg
Citric Acid—600 mg
Gum Arabic—1597 mg
*Stevia*—105 mg Orange Flavor—140 mg
Pineapple Flavor Curcumin-C without Polymer The method steps of making Curcumin-C without polymer are discussed below. As shown in FIGS. 1-3, the method of making Curcumin-C without polymer mainly includes (1) preparing aqueous phase (A1), (2) preparing oil phase with emulsifier (O1), and (3) mixing/homogenizing the aqueous and oil phases.

As shown in FIG. 1, the method steps for generating/preparing an aqueous phase (A1) include STEPS C1 through C5. These steps are:

- dissolving *stevia* in 5% w/w of hot purified water at about 55° C. based on a total weight of the *stevia*, so as to form Subcomposition-I (STEP C1), all natural flavors such as pineapple and orange flavors are incorporated with *stevia;*
- dissolving a first measurement of curcumin mix (CM1) in sufficient amount of hot purified water at a temperature not more than 65° C., so as of form Subcomposition-II (STEP C2), the curcumin mix includes curcumin, piperic acid, sodium ascorbate, ascorbic acid blend that includes citrus bioflavonals;
- adding and/or mixing Subcomposition-I to Subcomposition-II, so as to form Subcomposition-III (STEP C3);
- adding and/or mixing surfactant/emulsifier (e.g., TWEEN-80) and/or citric acid to Subcomposition-III, so as to form Subcomposition-IV (STEP C4); the TWEEN 80 may not be generally used in the dietary supplement compositions which are required to be spray dried;
- thereafter, stirring Subcomposition-IV for a predetermined time period, e.g., for 2 minutes, so as to form Subcomposition-V (STEP C5);

In this manner, by performing steps C1 through C5, an aqueous phase for Curcumin-C without polymer is generated.

As shown in FIG. 2, the method steps for generating an Oil Phase with Emulsifier (O1), i.e., Subcomposition-VI, include:

- mixing phospholipids/phospholipids fraction (e.g., sunflower lecithin) and mixed tocopherols together under 65° C. (STEP C6); and
- stirring mix of phospholipids/phospholipids fraction and mixed tocopherols for 2 minutes so as to form a Subcomposition-VI, i.e., an oil phase (STEP C7).

In this manner, by performing steps C6 and C7, an oil phase is generated for Curcumin-C.

As shown in FIG. 3, the further steps for preparing a Curcumin-C dietary supplement include:

- adding/mixing the Subcomposition-V (A1) and the Subcomposition-VI (O1) into in a Stainless Steel vessel (STEP C8);
- performing first homogenizing step by mixing the A1 and the O1 at 1,000 rpm progressively increasing to 5,000 rpm for a first predetermined time period (e.g. 30 minutes) using a high-shear homogenizer, so as to form an A1/O1 composition (Subcomposition-VII) (STEP C9);
- adding and/or mixing a second measurement of curcumin mix (CM2) to the A1/O1 composition (STEP C10), this step is optional depending on loss of curcumin and vitamin C in the previous steps;
- performing second homogenizing step by mixing CM2 and the A1/O1 composition for a second predetermined time period (e.g., not less than 10 minutes) at 1,000 rpm progressively increasing to 5,000 rpm at not more than 65° C., so as to form an A1/O1/CM2 composition (Subcomposition-VIII) (STEP C11);
- adding a first flavor (F1) including an oil phase flavor to the A1/O1/CM2 composition (STEP C12);
- performing third step of homogenizing A1/O1/CM2 composition and the F1 for a third predetermined time period (e.g., 3-5 minutes) at 1,000 rpm progressively increasing to 5,000 rpm at not more than 65° C., so as to form an A1/O1/CM2/F1 composition (Subcomposition-IX) (STEP C13);
- adding gum arabic dispersed along with balance quantity of 50% glycerin (GG) to A1/O1/CM2/F1 composition (STEP C14), xanthan gum may be used in place of gum arabic;
- performing fourth step of homogenizing a final liquid, i.e., mixture of A1/O1/CM2/F1 composition and GG for a fourth predetermined time period (e.g., 10 minutes) at 1,000 rpm progressively increasing to 5,000 rpm at not more than 65° C., so as to form an A1/O1/CM2/F1/GG composition (Subcomposition-X) (STEP C15);
- adding a second flavor (F2) including an aqueous phase flavor to the A1/O1/CM2/F1/GG composition (STEP C16); and making up the weight to 100% with purified water under constant stirring, i.e., by performing fifth step of homogenizing by mixing the A1/O1/CM2/F1/GG composition and the F2 for a fifth predetermined time period (e.g., 3-5 minutes) using the high shear homogenizer rotated at 1,000 rpm progressively increasing to 3,500 rpm at not more than 65° C., so as to form an A1/O1/CM2/F1/GG/F2 composition (Subcomposition-XI) (STEP C17); and
- allowing flavors to maturate for 6 hours in the A1/O1/CM2/F1/GG/F2 composition, so as to form Subcomposition-XII (STEP C18);
- subsequently, nitrogen-flushing a final liquid, i.e. the A1/O1/CM2/F1/GG/F2 composition (STEP C19); and
- finally, spray drying the A1/O1/CM2/F1/GG/F2 and placing/storing the spray dried composition in a well labeled and sealed container.

In this manner Curcumin-C without polymer (aqueous-oil-curcumin mix-first-flavor-gum-second-flavor composition) is produced. The time periods for various steps noted above may be varied.

The Curcumin-C without polymer composition is a dispersion in which the curcumin mix is incorporated within the liposomal vesicles. The Curcumin-C dispersion may be filtered using a tangential flow technique which washes out outer periphery of liposomal vesicles so as to remove inactive ingredient contained outside the liposomal vesicles.

The time for flavoring is generally limited to 6 hours to prohibit bacterial growth. However, the flavoring time may be extended if preservatives those inhibiting bacteria growth are used.

The spray drying process allows the aqueous-oil-curcumin mix-first-flavor-gum-second-flavor composition be put into a spray dryer with minimum inlet temperature at 105° C.

When using a spray dryer the average recovery rate is 92% so it is generally desirable to always add 10% overage on all actives ingredients in order to offset loss due to spray process.

Curcumin-C with Polymer

Curcumin-C with polymer is a variation of the Curcumin-C without polymer composition discussed hereinabove. Curcumin-C with polymer includes a barrier coating of a polymer around and/or between liposomal vesicles having Curcumin-C incorporated therein. The barrier coating is not attached to the liposomal vesicles. Rather, it is flow flowing around the liposomal vesicles. The polymer may be one of PEG, and a biopolymer derived from fenugreek seeds, chitosan, and a combination thereof. Such polymer coating provides extra strength to liposomal vesicles filled with Curcumin-C. When the composition including Curcumin-C with polymer is ingested, it slowly releases of Curcumin-C in a blood stream over an extended time period.

Figure 4:
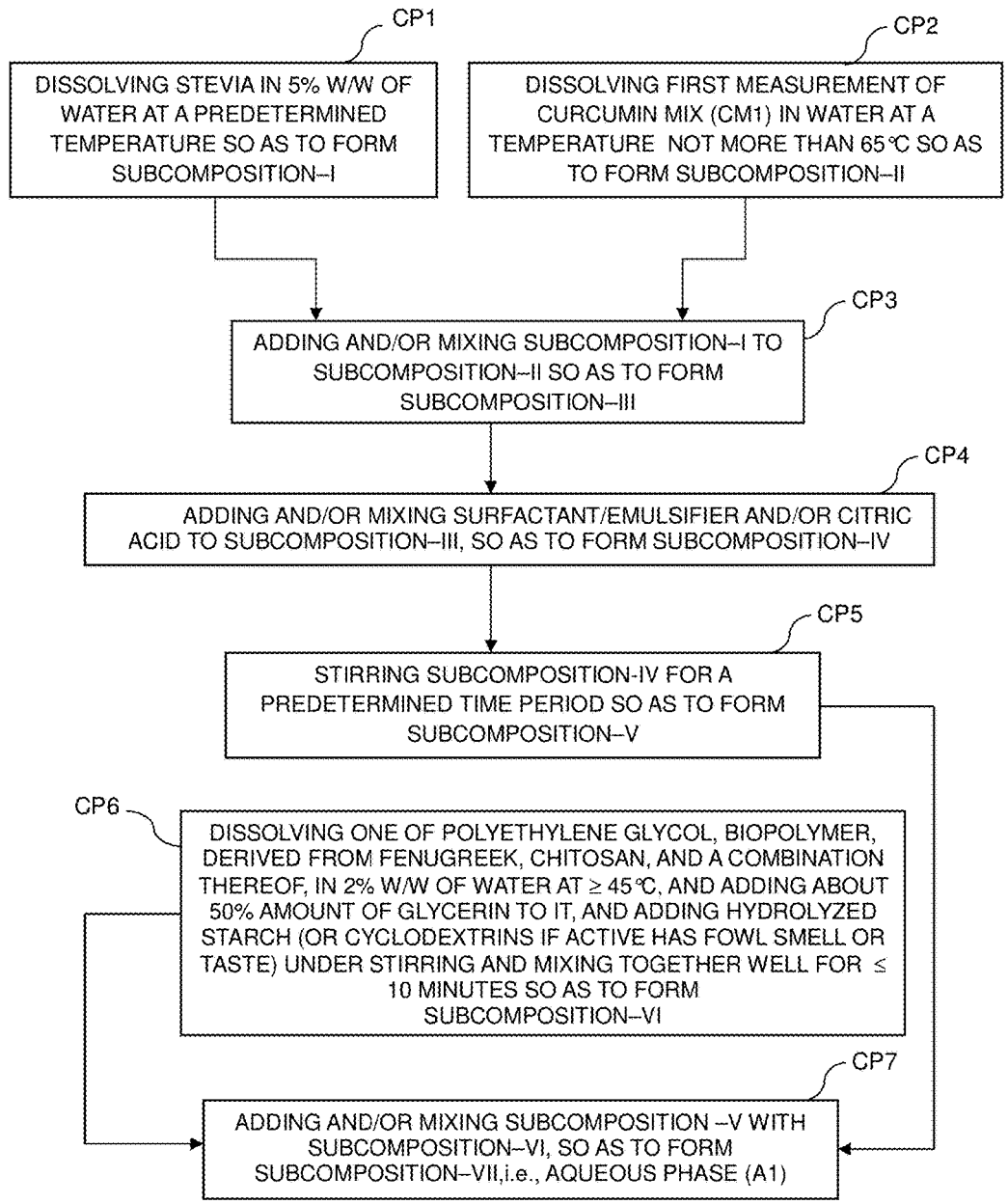
FIG. 4 is a flowchart showing method steps of generating an aqueous phase for Curcumin-C with polymer according to an illustrative embodiment of the present invention.
Figure 5:
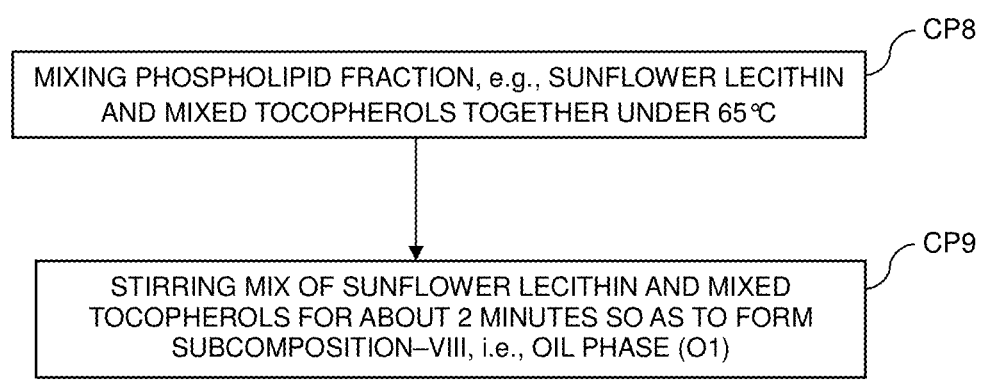
FIG. 5 is a flowchart showing method steps of generating an oil phase for Curcumin-C with polymer.
Figure 6:
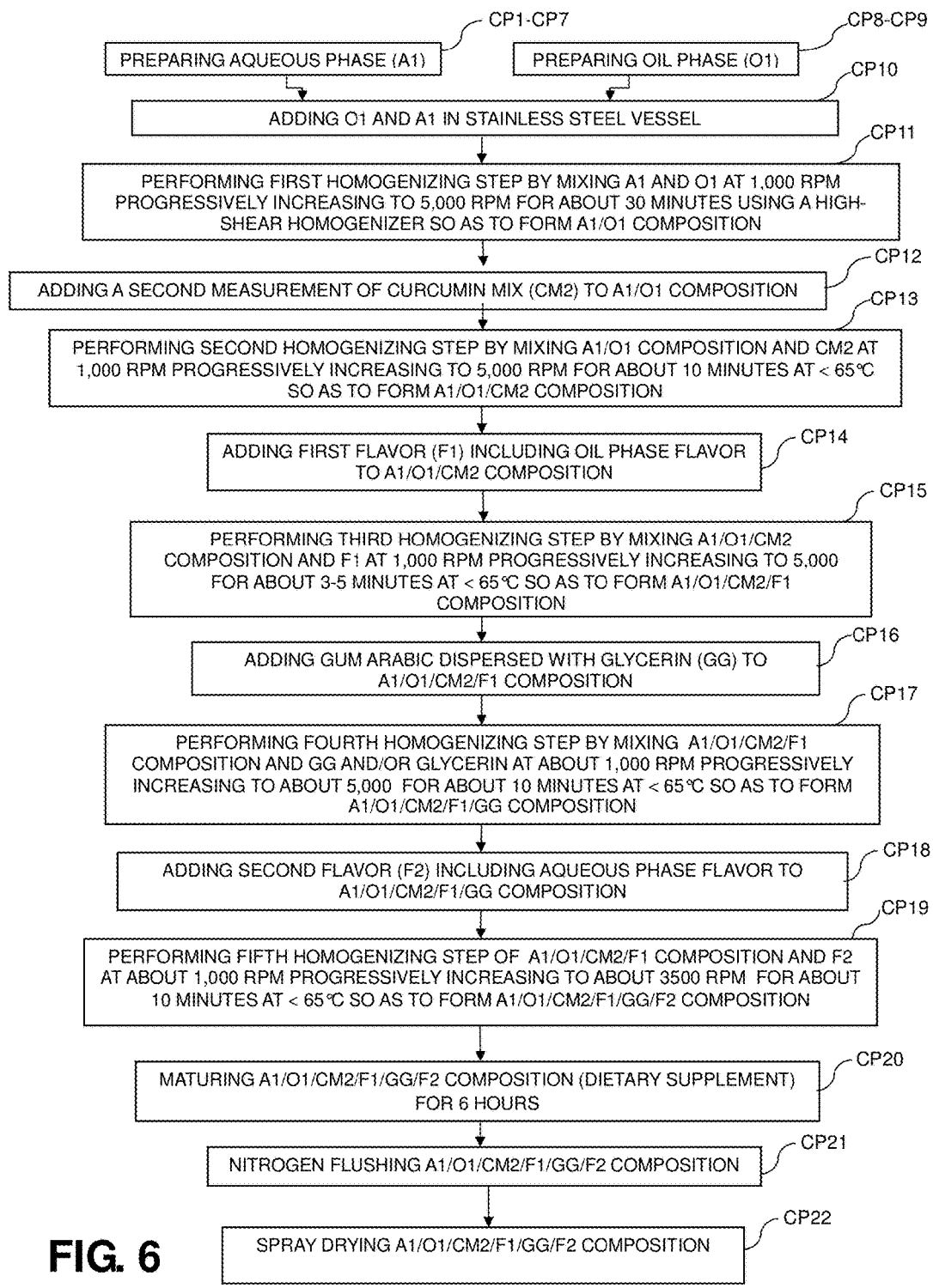
FIG. 6 is flowchart showing steps of preparing Curcumin-C with polymer.

The method steps of making Curcumin-C with polymer are discussed below. As shown in FIGS. 4-6, the method of making Curcumin-C with polymer includes (1) preparing aqueous phase having a polymer, (2) preparing oil phase with emulsifier, and (3) mixing/homogenizing the aqueous and oil phases.

As shown in FIG. 4, the method steps for generating/preparing an aqueous phase (A1) include STEPS CP1 through CP7. These steps are:

dissolving *stevia* in 5% w/w of hot purified water at about 55° C. based on a total weight of the *stevia*, so as to form Subcomposition-I (STEP CP1), all natural flavors such as pineapple and orange flavors are incorporated with *stevia*;

dissolving a first measurement of curcumin mix (CM1) in sufficient amount of hot purified water at a temperature not more than 65° C., so as of form Subcomposition-II (STEP CP2), the curcumin mix includes curcumin, piperic acid, sodium ascorbate, ascorbic acid blend that includes citrus bioflavonals;

adding and/or mixing Subcomposition-I to Subcomposition-II, so as to form Subcomposition-III (STEP CP3);

adding and/or mixing surfactant/emulsifier (e.g., TWEEN-80) and/or citric acid to Subcomposition-III, so as to form Subcomposition-IV (STEP CP4);

thereafter, stirring Subcomposition-IV for a predetermined time period, e.g., for 2 minutes, so as to form Subcomposition-V (STEP CP5);

dissolving one of PEG, a biopolymer (such as one derived from fenugreek seeds), chitosan, and a combination thereof in 2% w/w of hot water at not less than 45° C. based on a total weight of polymer, and adding 50% amount of glycerin by weight to it, and adding one of hydrogenated glucose syrup/hydrolyzed starch (such as Lycasi) or cyclodextrin-a and cyclodextrin-c up to 3% by mass of the curcumin mix (addition of cyclodextrin-a and cyclodextrin-c generally preferable when active ingredients have fowl, unpleasant smell or taste) under stirring and mix together well for not more than 10 minutes so as to form Subcomposition-VI (STEP CP6); and adding and/or mixing Subcomposition V with Subcomposition-VI, so as to form Subcomposition-VII, i.e., an aqueous phase (STEP CP7).

In this manner, by performing steps CP1 through CP7, an aqueous phase for curcumin-c with polymer is generated.

In cases where the active ingredients have smell or taste issues that prohibit pleasant organoleptic experience, the hydrolyzed starch may be entirely replaced with cyclodextrin-a and cyclodextrin-c in an amount equal to 3% by mass of the actual active ingredients. This process can be extended from <10 minutes to 1 hour when cyclodextrin-a and cyclodextrin-c are used in place of hydrolyzed starch. In Curcumin-C dietary supplement compositions, it is not required that cyclodextrins be added because the active ingredient—curcumin mix—does not exhibit fowl, unpleasant taste or smell for most of the consumers. However, for consumer who find curcumin mix having fowl taste or smell, or unpleasant/undesirable taste or smell, cyclodextrin-a and cyclodextrin-c are added in the method Step CP 6.

As shown in FIG. 5, the method steps for generating an Oil Phase with Emulsifier (O1), i.e., Subcomposition-VI, include:

mixing phospholipids/phospholipids fraction (e.g., sunflower lecithin) and mixed tocopherols together under 65° C. (STEP CP8); and stirring mix of phospholipids/phospholipids fraction and mixed tocopherols for 2 minutes so as to form a Subcomposition-VIII, i.e., an oil phase (STEP CP9).

In this manner, by performing steps CP8 and CP9, an oil phase is generated for curcumin-C with polymer. As it may be noted generation of oil phase for Curcumin-C without polymer and curcumin-C with polymer is same.

As shown in FIG. 3, the further steps for preparing a Curcumin-C with polymer include:

adding/mixing the Subcomposition-VII (A1) and the Subcomposition-VIII (O1) into in a Stainless Steel vessel (STEP CP10);

performing first homogenizing step by mixing the A1 and the O1 at 1,000 rpm progressively increasing to 5,000 rpm for a first predetermined time period (e.g. 30 minutes) using a high-shear homogenizer, so as to form an A1/O1 (Subcomposition-IX) (STEP CP11);

adding and/or mixing a second measurement of curcumin mix (CM2) to the aqueous-oil composition (STEP CP12), this step is optional and is performed based on whether there is any loss of curcumin and vitamin C in the previous steps;

performing second homogenizing step by mixing CM2 and the A1/O1 composition for a second predetermined time period (e.g., not less than 10 minutes) at 1,000 rpm progressively increasing to 5,000 rpm at not more than 65° C., so as to form an A1/O1/CM2 composition (Subcomposition-X) (STEP CP13);

adding a first flavor (F1) including an oil phase flavor to the A1/O1/CM2 composition (STEP CP14);

performing third step of homogenizing A1/O1/CM2 composition and the F1 for a third predetermined time period (e.g., 3-5 minutes) at 1,000 rpm progressively increasing to 5,000 rpm at not more than 65° C., so as to form an A1/O1/CM2/F1 composition (Subcomposition-XI) (STEP CP15);

adding gum arabic dispersed along with balance quantity of 50% glycerin (GG) to A1/O1/CM2/F1 composition (STEP CP16), xanthan gum may be used instead of gum arabic;

performing fourth step of homogenizing a final liquid, i.e., mixture of A1/O1/CM2/F1 composition and GG for a fourth predetermined time period (e.g., 10 minutes) at 1,000 rpm progressively increasing to 5,000 rpm at not more than 65° C., so as to form an A1/O1/CM2/F1/GG composition (Subcomposition-XII) (STEP CP17);

adding a second flavor (F2) including an aqueous phase flavor to the A1/O1/CM2/F1/GG composition (STEP CP18); and making up the weight to 100% with purified water under constant stirring, i.e., by performing fifth step of homogenizing by mixing the A1/O1/CM2/F1/GG composition and the F2 for a fifth predetermined time period (e.g., 3-5 minutes) using the high shear homogenizer rotated at 1,000 rpm progressively increasing to 3,500 rpm at not more than 65° C., so as to form an A1/O1/CM2/F1/GG/F2 composition (Subcomposition-XIII) (STEP CP19); and allowing flavors to maturate for about 6 hours in the A1/O1/CM2/F1/GG/F2 composition, so as to form Subcomposition-XIV (STEP CP20);

subsequently, nitrogen-flushing a final liquid, i.e. the A1/O1/CM2/F1/GG/F2 composition (STEP CP21); and further, spray drying the A1/O1/CM2/F1/GG/F2 composition and placing/storing the spray dried composition in a well labeled and sealed container (STEP CP22).

In this manner Curcumin-C with Polymer is made. The time periods for various steps noted above may be varied.

The Curcumin-C with polymer is a dispersion in which the curcumin mix is incorporated within the liposomal vesicles. The liposomal vesicles are provided with free flowing barrier coating of the polymer, i.e., one of PEG, a biopolymer, chitosan, and a combination thereof. The Curcumin-C dispersion may be filtered using a tangential flow technique which washes out outer periphery of liposomal vesicles so as to remove inactive ingredient contained outside the liposomal vesicles. It may be, however, noted that the tangential flow does not wash out barrier coating of polymers surrounding the liposomes.

The time for flavoring is generally limited to 6 hours to prohibit bacterial growth. The spray drying process allows the aqueous-oil-curcumin mix-first-flavor-gum-second-flavor composition be put into a spray dryer with minimum inlet temperature at 105° C. As noted above, when using a spray dryer the average recovery rate is 92% so it is generally desirable to always add 10% overage on all actives in order to offset loss due to spray process.

Glutasome

Glutasome is a dietary supplement composition that includes reduced glutathione as one of active ingredients. The Glutasome can be made in different compositions. The first composition, e.g., Glutasome without polymer, may include all ingredients free from genetically modified organisms (GMO), that is, all ingredients are Non-GMO ingredients, and non-soy preparation that are free from preservatives. However, if desired, it is possible to use GMO ingredients in combination with or without non-GMO ingredients. In the Glutasome, the active ingredients are reduced glutathione, piperic acid, sodium ascorbate, ascorbic acid blend that includes citrus bioflavanols (mix) and pterostilbene. The Glutasome is encapsulated in liposomal vesicles. Such liposomal vesicles do not have a barrier coating of a polymer applied to them.

The second composition (Glutasome with Polymer) is a variation of the first composition in that it includes barrier coating of a polymer around and/or between liposomal vesicles. Again, the ingredients used may be GMO or non-GMO, or combination thereof. The polymer coating provides extra strength to liposomal vesicles filled with reduced glutathione (and additional active ingredients) so to sustain them in a blood stream for an extended time period.

It may be noted that both the first and second compositions are designed to be selectively flavored, as desired, such as pineapple and orange or raspberry and/or lemon flavors incorporated with *stevia* and citric acid, and to allow for the liposomal vesicles to reconstitute within the water.

Figure 7:
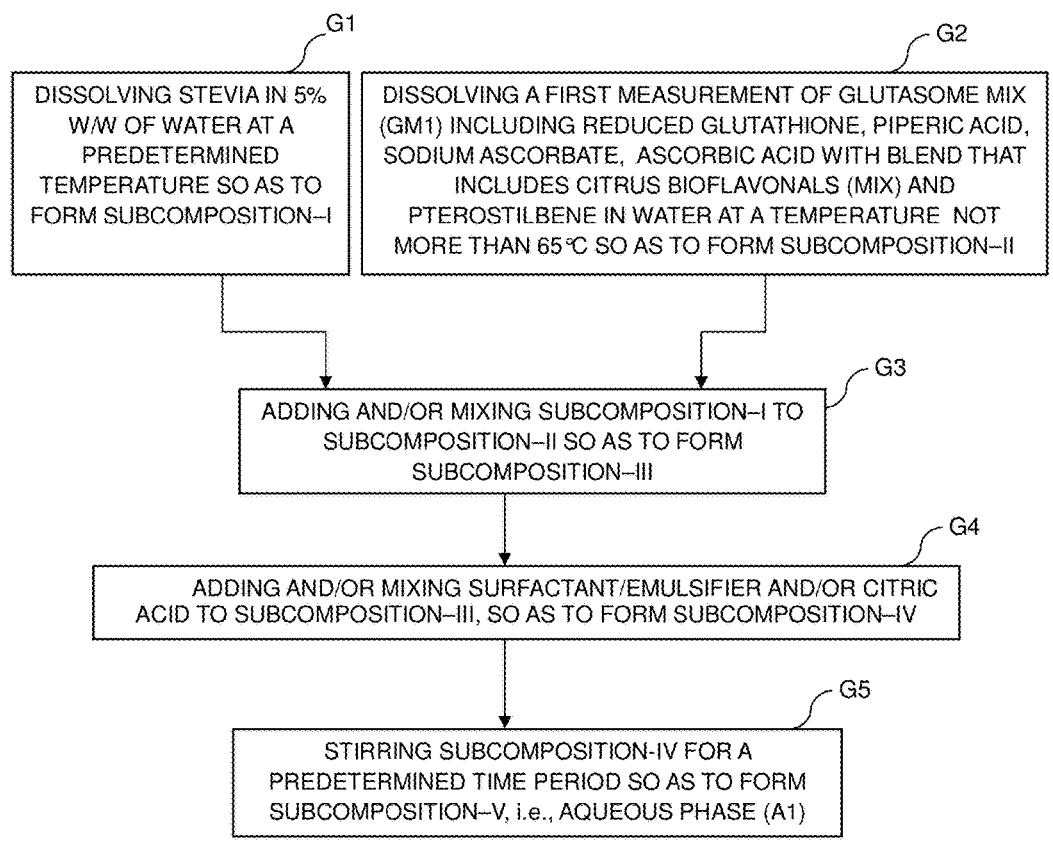
FIG. 7 is a flowchart showing method steps of generating an aqueous phase for Glutasome without polymer according to an illustrative embodiment of the present invention.
Figure 8:
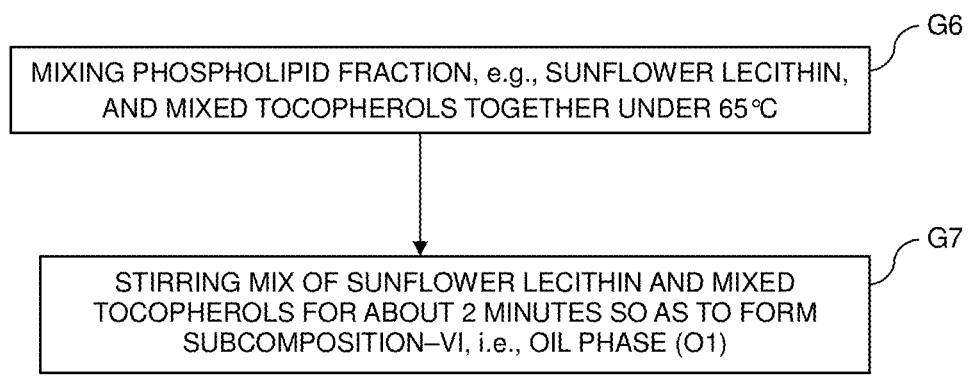
FIG. 8 is a flowchart showing method steps of generating an oil phase for Glutasome without polymer.
Figure 9:
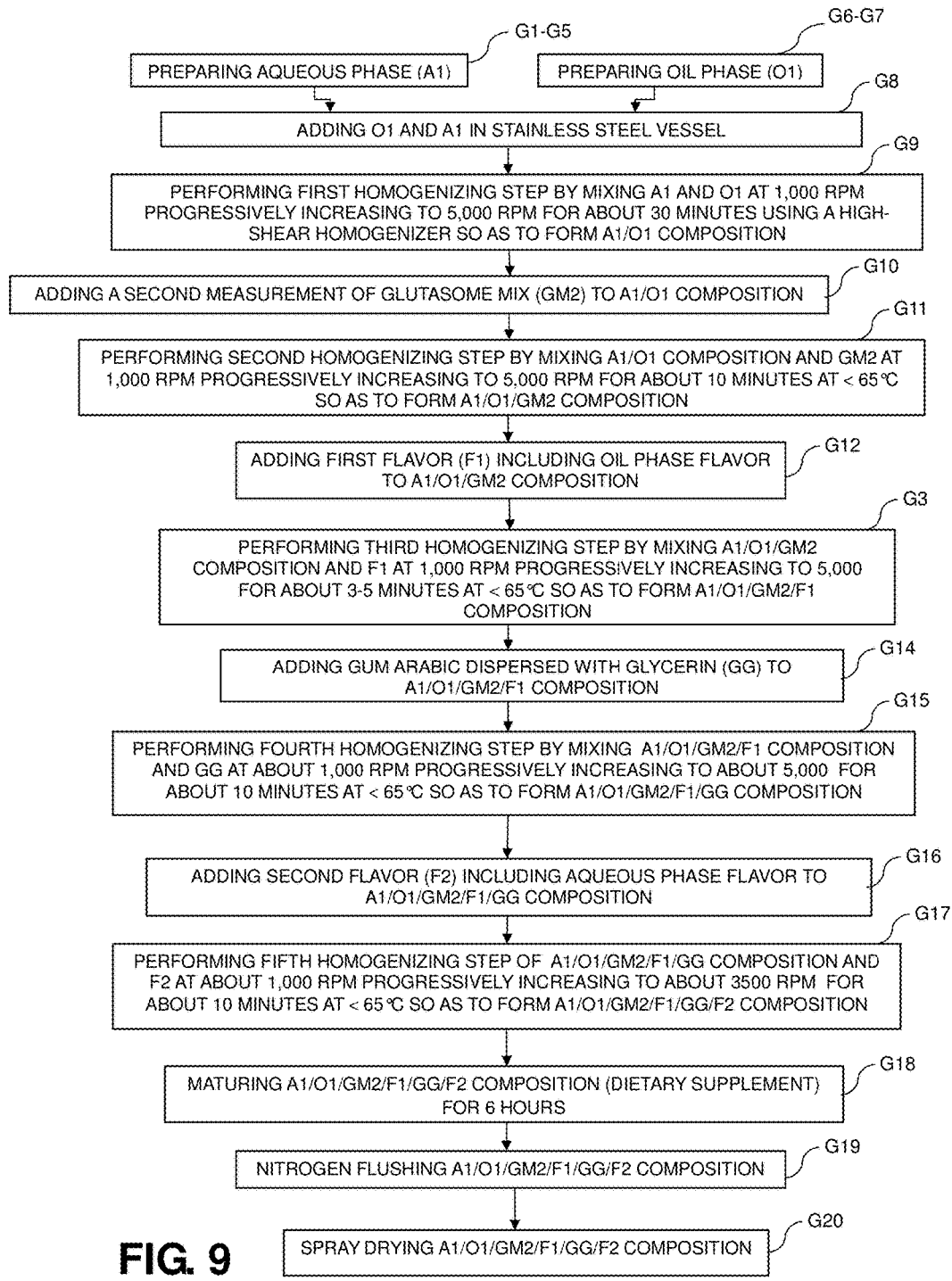
FIG. 9 is flowchart showing steps of preparing Glutasome without polymer.

A typical composition of Glutasome compositions with or without polymer includes:

Glutathione—500 mg
Pureway—500 mg (Vitamin C)
Piperic Acid—3 mg
Pterostilbene—100 mg
Sunflower Lecithin—500 mg
Citric Acid—1800 mg
Gum Arabic—797 mg
*Stevia*—180 mg
Raspberry Flavor—1380 mg
Lemon Flavor—105 mg
Soluble Dietary Fiber—75 mg (the soluble dietary fiber may be cyclodextrin-a)
Sodium Chloride—60 mg Glutasome without Polymer The method steps of making Glutasome without Polymer are discussed below. As shown in FIGS. 7-9. In Glutasome without polymer, the active ingredient is glutasome mix. The glutasome mix includes reduced glutathione, piperic acid, sodium ascorbate, ascorbic acid blend that includes citrus bioflavanols (mix) and pterostilbene.

The method of making Glutasome without polymer includes (1) preparing aqueous phase, (2) preparing oil phase with emulsifier, and (3) mixing/homogenizing the aqueous and oil phases.

As shown in FIG. 7, the method steps for generating/preparing an aqueous phase (A1) include STEPS G1 through G5. These steps are:

dissolving *stevia* in 5% w/w of hot purified water at about 55° C. based on a total weight of the *stevia*, so as to form Subcomposition-I (STEP G1), all natural flavors such as raspberry and lemonade flavors are incorporated with *stevia*;

dissolving a first measurement of glutasome mix (GM1) in sufficient amount of hot purified water at a temperature not more than 65° C., so as of form Subcomposition-II (STEP G2), again, it may be noted that the glutasome mix includes reduced glutathione, piperic acid, sodium ascorbate, ascorbic acid blend that includes citrus bioflavanols (mix) and pterostilbene;

adding and/or mixing Subcomposition-I to Subcomposition-II, so as to form Subcomposition-III (STEP G3);

adding and/or mixing surfactant/emulsifier (e.g., TWEEN 80) and/or citric acid to Subcomposition-III, so as to form Subcomposition-IV (STEP G4), it may be noted that the surfactant/emulsifier is generally is not included in all natural composition which do not include polymers;

thereafter, stirring mixture of the surfactant/emulsifier and/or the citric acid, and Subcomposition-IV for a predetermined time period, e.g., for 2 minutes, so as to form Subcomposition-V (STEP G5);

In this manner, by performing steps G1 through G5, an aqueous phase (A1) for Glutasome without polymer is generated.

As shown in FIG. 8, the method steps for generating an Oil Phase with Emulsifier (O1), i.e., Subcomposition-VI, include:

mixing phospholipids/phospholipids fraction (e.g., sunflower lecithin) and mixed tocopherols together under 65° C. (STEP G6); and stirring mix of phospholipids/phospholipids fraction and mixed tocopherols for 2 minutes so as to form a Subcomposition-VI, i.e., an oil phase (STEP G7).

In this manner, by performing steps G6 and G7, an oil phase (O1) is generated for Glutasome without polymer.

As shown in FIG. 9, the further steps for preparing the dietary supplement composition of Glutasome without polymer include:

adding/mixing the Subcomposition-V (A1) and the Subcomposition-VI (O1) into in a Stainless Steel vessel (STEP G8);

performing first homogenizing step by mixing the A1 and the O1 at 1,000 rpm progressively increasing to 5,000 rpm for a first predetermined time period (e.g. 30 minutes) using a high-shear homogenizer, so as to form an A1/O1 composition (Subcomposition-VII) (STEP G9);

adding and/or mixing a second measurement of glutasome mix (GM2) to the A1/O1 composition (STEP G10), this method step is optional depending on loss of glutasome mix in the previous steps;

performing second homogenizing step by mixing GM2 and the A1/O1 composition for a second predetermined time period (e.g., not less than 10 minutes) at 1,000 rpm progressively increasing to 5,000 rpm at not more than 65° C., so as to form an A1/O1/GM2 composition (Subcomposition-VIII) (STEP G11);

adding a first flavor (F1) including an oil phase flavor to the A1/O1/GM2 composition (STEP G12);

performing third step of homogenizing A1/O1/GM2 composition and the F1 for a third predetermined time period (e.g., 3-5 minutes) at 1,000 rpm progressively increasing to 5,000 rpm at not more than 65° C., so as to form an A1/O1/GM2/F1 composition (Subcomposition-IX) (STEP G13);

adding Gum arabic dispersed along with balance quantity of 50% glycerin (GG) to the A1/O1/GM2/F1 composition (STEP G14), xanthan gum may used instead of gum arabic;

performing fourth step of homogenizing a final liquid, i.e., mixture of A1/O1/GM2/F1 composition and GG for a fourth predetermined time period (e.g., 10 minutes) at 1,000 rpm progressively increasing to 5,000 rpm at not more than 65° C., so as to form an A1/O1/GM2/F1/GG composition (Subcomposition-X) (STEP G15);

adding a second flavor (F2) including an aqueous phase flavor to the A1/O1/GM2/F1/GG composition (STEP G16); and making up the weight to 100% with purified water under constant stirring, i.e., by performing fifth step of homogenizing by mixing the A1/O1/GM2/F1/GG composition and the F2 for a fifth predetermined time period (e.g., 3-5 minutes) using the high shear homogenizer rotated at 1,000 rpm progressively increasing to 3,500 rpm at not more than 65° C., so as to form an A1/O1/GM2/F1/GG/F2 composition (Subcomposition-XI) (STEP G17); and allowing flavors to maturate for 6 hours in the A1/O1/GM2/F1/GG/F2 composition, so as to form Subcomposition-XII (STEP G18);

subsequently, nitrogen-flushing a final liquid, i.e. the A1/O1/GM2/F1/GG/F2 composition (STEP G19); and further, spray drying the A1/O1/GM2/F1/GG/F2 and placing/storing the spray dried composition in a well labeled and sealed container.

In this manner Glutasome without polymer (aqueous-oil-glutasome mix-first-flavor-gum-second-flavor composition, i.e., A1/O1/GM2/F1/GG/F2 composition) is made.

The Glutasome without polymer composition is a dispersion in which the glutasome mix is incorporated within the liposomal vesicles. The Glutasome dispersion may be filtered using a tangential flow technique which washes out outer periphery of liposomal vesicles so as to remove inactive ingredient contained outside the liposomal vesicles.

The time for flavoring is generally limited to 6 hours to prohibit bacterial growth. However, the flavoring time may be extended if preservatives those inhibiting bacteria growth are used.

The spray drying process allows the A1/O1/GM2/F1/GG/F2 (aqueous-oil-glutasome mix-first-flavor-gum-second-flavor) composition be put into a spray dryer with minimum inlet temperature at 105° C.

When using a spray dryer the average recovery rate is 92% so it is generally desirable to always add 10% overage on all actives in order to offset loss due to spray process.

Glutasome with Polymer

Glutasome with polymer is a variation of the Glutasome without polymer discussed hereinabove. Glutasome with polymer includes a barrier coating a polymer around and/or between liposomal vesicles having glutasome mix incorporated therein. The polymer may be one PEG, a biopolymer derived from fenugreek seeds or marine life, and combination thereof. Such coating provides extra strength to liposomal vesicles filled with glutasome mix. When the composition including Glutasome with polymer is ingested by humans or animals, it slowly releases of reduced glutathione and vitamin C (and other active ingredients incorporated in the glutasome mix) in a blood stream over an extended time period.

The method steps of making Glutasome with polymer are discussed below.

Figure 10:
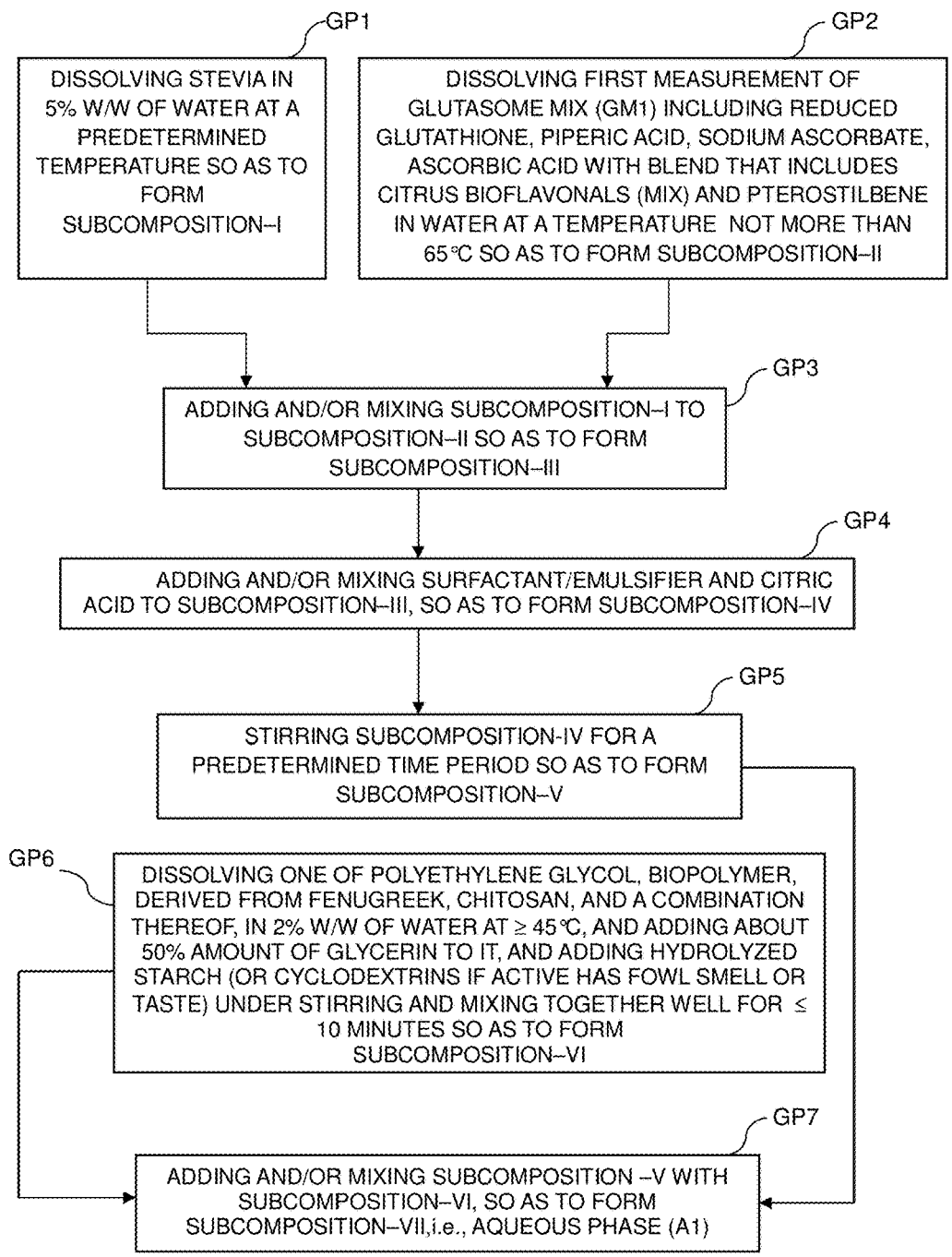
FIG. 10 is a flowchart showing method steps of generating an aqueous phase for Glutasome with polymer according to an illustrative embodiment of the present invention.
Figure 11:
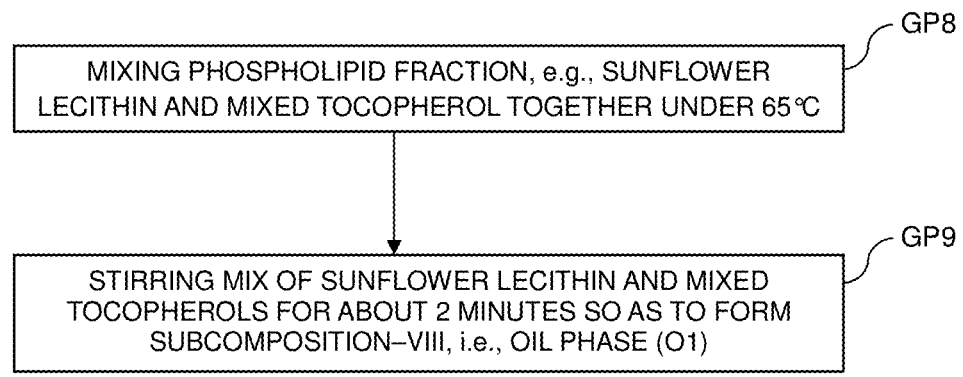
FIG. 11 is a flowchart showing method steps of generating an oil phase for Glutasome with polymer.
Figure 12:
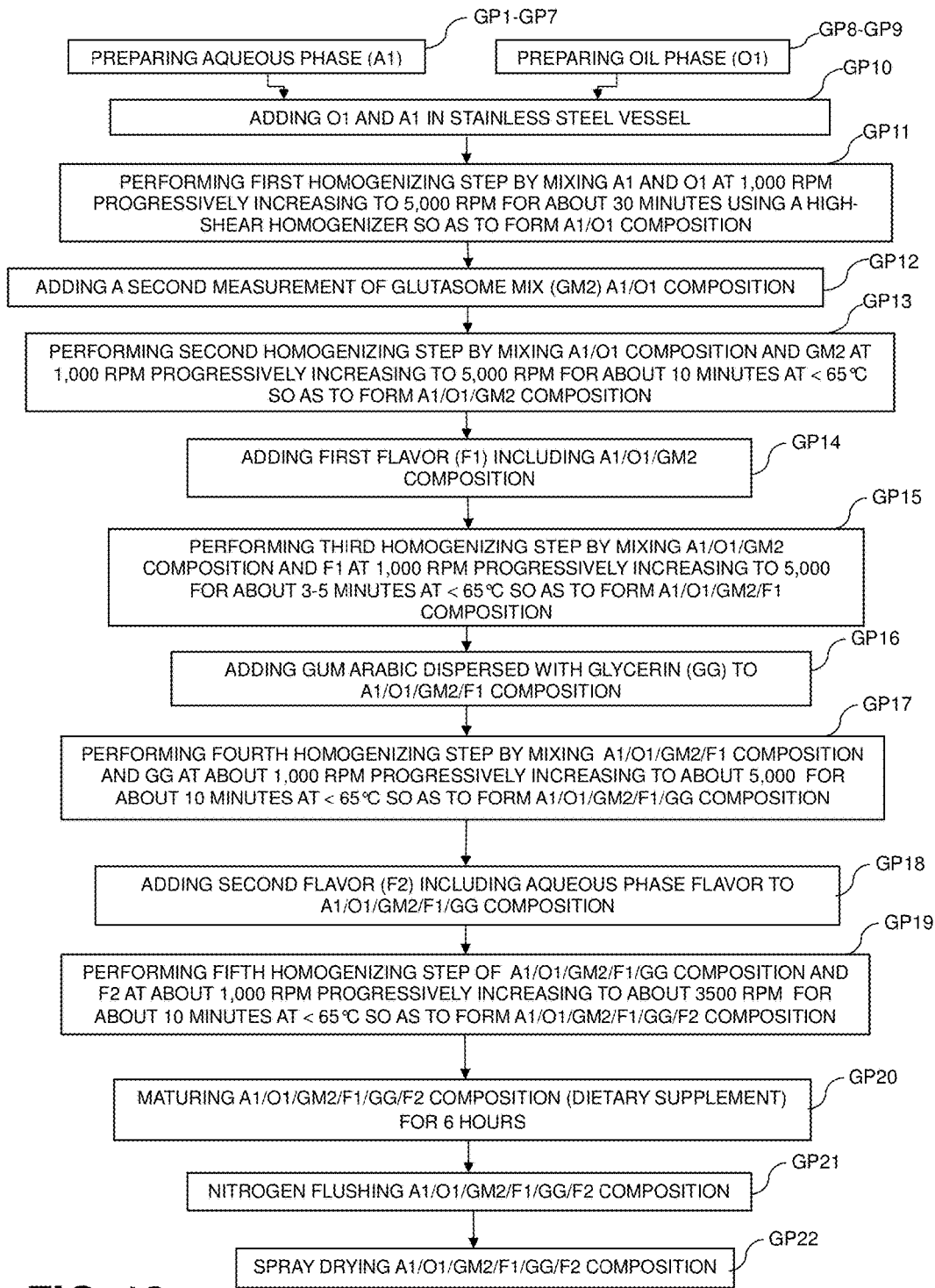
FIG. 12 is flowchart showing steps of preparing Glutasome with polymer.

As shown in FIGS. 10-12, the method of making Glutasome with polymer includes (1) preparing aqueous phase having a polymer, (2) preparing oil phase with emulsifier, and (3) mixing/homogenizing the aqueous and oil phases.

As shown in FIG. 10, the method steps for generating/preparing an aqueous phase include STEPS GP1 through GP7. These steps are:

dissolving *stevia* in 5% w/w of hot purified water at about 55° C. based on a total weight of the *stevia*, so as to form Subcomposition-I (STEP GP1), all natural flavors such as raspberry and lemonade flavors are incorporated with *stevia*;

dissolving a first measurement of glutasome mix (GM1) in sufficient amount of hot purified water at a temperature not more than 65° C., so as of form Subcomposition-II (STEP GP2), it may be noted that the glutasome mix includes reduced glutathione, piperic acid, sodium ascorbate, ascorbic acid blend that includes citrus bioflavonals (mix) and pterostilbene;

adding and/or mixing Subcomposition-I to Subcomposition-II, so as to form Subcomposition-III (STEP GP3);

adding and/or mixing surfactant/emulsifier (e.g., TWEEN-80) and/or citric acid to Subcomposition-III, so as to form Subcomposition-IV (STEP GP4);

thereafter, stirring Subcomposition-IV for a predetermined time period, e.g., for 2 minutes, so as to form Subcomposition-V (STEP GP5);

dissolving one of PEG, a biopolymer (such as one derived from fenugreek seeds), chitosan and a combination thereof in 2% w/w of hot water at not less than 45° C. based on total weight of polymer, and adding 50% amount of glycerin by weight to it, and adding cyclodextrin-a and cyclodextrin-c (generally preferable when active has a foul, unpleasant smell or taste, such as in this case) or hydrogenated glucose syrup/hydrolyzed starch (such as Lycasi) under stirring and mix together well for not more than 10 minutes so as to form Subcomposition-VI (STEP GP6); and adding and/or mixing Subcomposition V with Subcomposition-VI, so as to form Subcomposition-VII, i.e., an aqueous phase (A1) (STEP GP7).

In this manner, by performing steps GP1 through GP7, an aqueous phase for Glutasome with polymer is generated.

In cases where the active has smell or taste issues that prohibit pleasant organoleptic experience, the hydrolyzed starch may be replaced with cyclodextrin-a and cyclodextrin-c in an amount equal to 3% of the actual active ingredient (here, reduced glutathione and vitamin C). This process can be extended from <10 minutes to 1 hour when cyclodextrin-a and cyclodextrin-c are exchanged or incorporated in place of hydrolyzed starch.

As shown in FIG. 11, the method steps for generating an Oil Phase with Emulsifier, i.e., Subcomposition-VI, include:
- mixing phospholipids/phospholipids fraction (e.g., sunflower lecithin) and mixed tocopherols together under 65° C. (STEP GP8); and
- stirring mix of phospholipids/phospholipids fraction and mixed tocopherols for 2 minutes so as to form a Subcomposition-VIII, i.e., an oil phase (STEP GP9).

In this manner, by performing steps GP8 and GP9, an oil phase is generated for Glutasome with polymer. As it may be noted methods steps for generating oil phase for Glutasome without polymer and Glutasome with polymer are same.

As shown in FIG. 12, the further steps for preparing a Glutasome with Polymer include:
- adding/mixing the Subcomposition-VII (A1) and the oil phase Subcomposition-VIII (O1) into in a Stainless Steel vessel (STEP GP10);
- performing first homogenizing step by mixing the A1 and the O1 at 1,000 rpm progressively increasing to 5,000 rpm for a first predetermined time period (e.g. 30 minutes) using a high-shear homogenizer, so as to form an A1/O1 composition (Subcomposition-IX) (STEP GP11);
- adding and/or mixing a second measurement of glutasome mix (GM2) to the A1/O1 composition (STEP GP12), this step may be optional depending on loss of GSH and vitamin C in the previous steps;
- performing second homogenizing step by mixing GM2 and the A1/O1 composition for a second predetermined time period (e.g., not less than 10 minutes) at 1,000 rpm progressively increasing to 5,000 rpm at not more than 65° C., so as to form an A1/O1/GM2 composition (Subcomposition-X) (STEP GP13);
- adding a first flavor (F1) including an oil phase flavor to the A1/O1/GM2 composition (STEP GP14);
- performing third step of homogenizing A1/O1/GM2 composition and the F1 for a third predetermined time period (e.g., 3-5 minutes) at 1,000 rpm progressively increasing to 5,000 rpm at not more than 65° C., so as to form an A1/O1/GM2/F1 composition (Subcomposition-XI) (STEP GP15);
- adding Gum arabic dispersed along with balance quantity of 50% glycerin (GG) to the A1/O1/GM2/F1 composition (STEP GP16), xanthan gum may be used instead of gum arabic;
- performing fourth step of homogenizing a final liquid, i.e., mixture of the A1/O1/GM2/F1 composition and GG for a fourth predetermined time period (e.g., 10 minutes) at 1,000 rpm progressively increasing to 5,000 rpm at not more than 65° C., so as to form an A1/O1/GM2/F1/GG composition (Subcomposition-XII) (STEP GP17);
- adding a second flavor (F2) including an aqueous phase flavor to the A1/O1/GM2/F1/GG composition (STEP GP18); and making up the weight to 100% with purified water under constant stirring, i.e., by performing fifth step of homogenizing by mixing the A1/O1/GM2/F1/GG composition and the F2 for a fifth predetermined time period (e.g., 3-5 minutes) using the high shear homogenizer rotated at 1,000 rpm progressively increasing to 3,500 rpm at not more than 65° C., so as to form an A1/O1/GM2/F1/GG/F2 composition (Subcomposition-XIII) (STEP GP19); and
- allowing flavors to maturate for 6 hours in the A1/O1/GM2/F1/GG/F2, so as to form Subcomposition-XIV (STEP GP20);
- subsequently, nitrogen-flushing a final liquid, i.e. the A1/O1/GM2/F1/GG/F2 composition (STEP GP21); and
- further, spray drying the A1/O1/GM2/F1/GG/F2 and placing/storing the spray dried composition in a well labeled and sealed container (STEP GP22).

In this manner Glutasome with polymer is made. The time periods for various steps noted above may be varied.

The Glutasome is a composition in dispersion in which the glutasome mix is incorporated within the liposomal vesicles. The liposomal vesicles are provided with free flowing barrier coating of the polymer used. The Glutasome with polymer dispersion may be filtered using a tangential flow technique which washes out outer periphery of liposomal vesicles so as to remove inactive ingredient contained outside the liposomal vesicles. It may be, however, noted that the tangential flow does not wash out barrier coating of polymers surrounding the liposomes.

The time for flavoring is generally limited to 6 hours to prohibit bacterial growth. The spray drying process allows the aqueous-oil-glutasome mix-first-flavor-gum-second-flavor composition be put into a spray dryer with minimum inlet temperature at 105° C. As noted above, when using a spray dryer the average recovery rate is 92% so it is generally desirable to always add 10% overage on all actives in order to offset loss due to spray process.

Gummies

Figure 17:
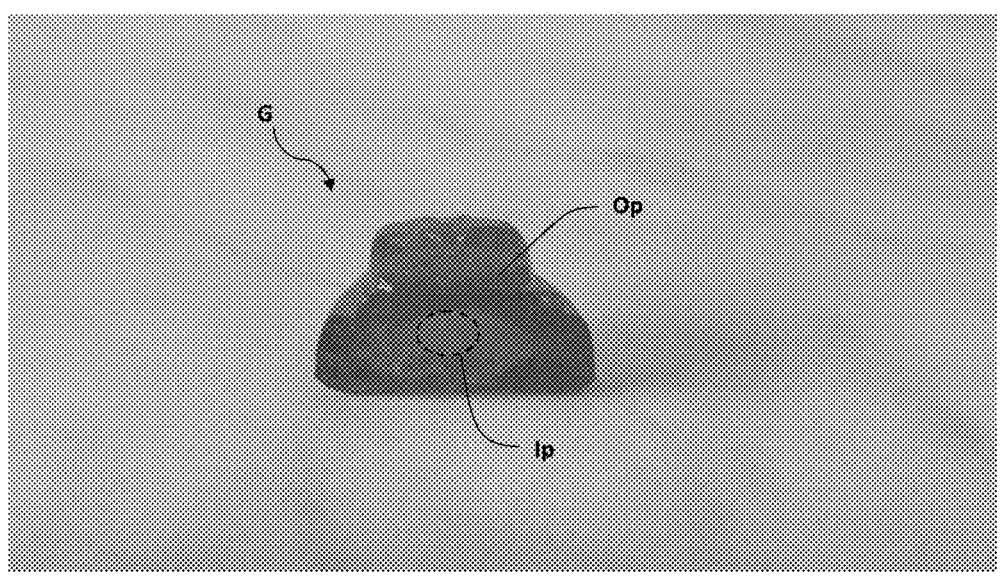
FIG. 17 is a view of a gummy prepared using the filling apparatus.

Gummies are chewable pieces, mostly of sweets. The gummies have a base material including gelatin or pectin. As shown in FIG. 17, the gummies according the present invention includes an inner portion Ip, and an outer portion Op which surrounds the inner portion Ip. The outer portion Op includes pectin. Pectin is preferred by vegetarians as it does not include any material derived from animals. Pectin is derived from fruits such as apples, pears, guavas, quince, plums, gooseberries and oranges.

Typical compositions of different types of gummies (serving size of 2 gummies) are provided below. These gummies are made using the method described herein.

B-12 Gummies
Active Ingredients:
Vitamin A (50% (2000 IU) Vitamin A acetate, 50% (2000 IU) as beta carotene—4000 IU
Vitamin C (50% ascorbic acid as 125 mg, 50% sodium ascorbate as 125 mg)—250 mg
Vitamin D (as cholecalciferol)—400 IU
Vitamin E (as dl-alpha tocopherol acetate)—30 IU
Riboflavin (Vitamin B2)—25 mg
Vitamin B6 (as pyridoxine HCl)—5 mg
Folic Acid—400 mcg
Vitamin B-12 (as methylcobalamin) as liposomal B-12—2500 mcg
Biotin—325 mcg
Pantothenic Acid (as d-calcium pantothenate)—10 mg
Iodine (as potassium iodide)—150 mcg
Zinc (as zinc oxide)—15 mg
Selenium (as sodium selenate)—110 mcg
Chromium (as chromium picolinate)—120 mcg
Iron (as ferrous fumarate)—18 mg
Choline—60 mcg
Boron (as boron citrate)—150 mcg
Inositol (as inositol niacinate)—60 mcg Other Ingredients: Non-GMO glucose, syrup, sugar, pectin, sunflower lecithin, purified water B-12 gummies are free of gluten, gelatin, contains no yeast, wheat, dairy, eggs, or peanuts. It contains no artificial flavors or preservatives Omega-3 Gummies
Active Ingredients:
Vitamin A (50% (2000 IU) Vitamin A acetate, 50% (2000 IU) as beta carotene—4000 IU
Vitamin C (50% ascorbic acid as 125 mg, 50% sodium ascorbate as 125 mg)—250 mg
Vitamin D (as cholecalciferol)—400 IU
Vitamin E (as dl-alpha tocopherol acetate)—30 IU
Riboflavin (Vitamin B2)—25 mg
Vitamin B6 (as pyridoxine HCl)—5 mg
Folic Acid—400 mcg
Vitamin B-12 (as methylcobalamin)—18 mcg
Biotin—325 mcg
Pantothenic Acid (as d-calcium pantothenate)—10 mg
Iodine (as potassium iodide)—150 mcg
Zinc (as zinc oxide)—15 mg
Selenium (as sodium selenate)—110 mcg
Chromium (as chromium picolinate)—120 mcg
Iron (as ferrous fumarate)—18 mg
Life's DHA DHA Omega-3 (docosahexaenoic acid) (from algal oil) as liposomal DHA Omega-3
Choline—60 mcg
Boron (as boron citrate)—150 mcg
Inositol (as inositol niacinate)—60 mcg
Other Ingredients: Non-GMO glucose, syrup, sugar, pectin, sunflower lecithin, algal oil, glycerin, high oleic sunflower oil, ascorbyl palmitate and tocopherols, beta-carotene and purified water
Omega-3 gummies are free of gluten, gelatin, contains no yeast, wheat, dairy, eggs, or peanuts. it has no artificial flavors or preservatives Vitamin C Gummies
Active Ingredients:
Vitamin A (50% (2000 IU) Vitamin A acetate, 50% (2000 IU) as beta carotene—4000 IU
Vitamin C (50% ascorbic acid as 125 mg, 50% sodium ascorbate as 125 mg) as (liposomal Vitamin C)—250 mg
Vitamin D (as cholecalciferol)—400 IU
Vitamin E (as dl-alpha tocopherol acetate)—30 IU
Riboflavin (Vitamin B2)—25 mg
Vitamin B6 (as pyridoxine HCl)—5 mg
Folic Acid—400 mcg
Vitamin B-12 (as methylcobalamin)—18 mcg
Biotin—325 mcg
Pantothenic Acid (as d-calcium pantothenate)—10 mg
Iodine (as potassium iodide)—150 mcg
Zinc (as zinc oxide)—15 mg
Selenium (as sodium selenate)—110 mcg
Chromium (as chromium picolinate)—120 mcg
Iron (as ferrous fumarate)—18 mg
Choline—60 mcg
Boron (as boron citrate)—150 mcg
Inositol (as inositol niacinate)—60 mcg
Other Ingredients: Non-GMO glucose, syrup, sugar, pectin, sunflower lecithin, and purified water.
Vitamin C gummies are free of gluten, gelatin. It contains no yeast, wheat, dairy, eggs, or peanuts, artificial flavors or preservatives.

Vitamin D-3 Gummies
Active Ingredients:
Vitamin A (50% (2000 IU) Vitamin A acetate, 50% (2000 IU) as beta carotene—4000 IU
Vitamin C (50% ascorbic acid as 125 mg, 50% sodium ascorbate as 125 mg)—250 mg
Vitamin D (as cholecalciferol) as (liposomal Vitamin D-3)—400 IU
Vitamin E (as dl-alpha tocopherol acetate)—30 IU
Riboflavin (Vitamin B2)—25 mg
Vitamin B6 (as pyridoxine HCl)—5 mg
Folic Acid—400 mcg
Vitamin B-12 (as methylcobalamin)—18 mcg
Biotin—325 mcg
Pantothenic Acid (as d-calcium pantothenate)—10 mg
Iodine (as potassium iodide)—150 mcg
Zinc (as zinc oxide)—15 mg
Selenium (as sodium selenate)—110 mcg
Chromium (as chromium picolinate)—120 mcg
Iron (as ferrous fumarate)—18 mg
Choline—60 mcg
Boron (as boron citrate)—150 mcg
Inositol (as inositol niacinate)—60 mcg
Other Ingredients: Non-GMO glucose, syrup, sugar, pectin, sunflower lecithin, and purified water. It is free of gluten and gelatin. It contains no yeast, wheat, dairy, eggs, or peanuts, artificial flavors or preservatives.

Methylsulfonylmethane (MSM), Glucosamine and Chondrotin Gummies
Active Ingredients:
Vitamin A (50% (2000 IU) Vitamin A acetate, 50% (2000 IU) as beta carotene—4000 IU
Vitamin C (50% ascorbic acid as 125 mg, 50% sodium ascorbate as 125 mg)—250 mg
Vitamin D (as cholecalciferol)—400 IU
Vitamin E (as dl-alpha tocopherol acetate)—30 IU
Riboflavin (Vitamin B2)—25 mg
Vitamin B6 (as pyridoxine HCl)—5 mg
Folic Acid—400 mcg
Vitamin B-12 (as methylcobalamin)—18 mcg
Biotin—325 mcg
Pantothenic Acid (as d-calcium pantothenate)—10 mg
Iodine (as potassium iodide)—150 mcg
Zinc (as zinc oxide)—15 mg
Selenium (as sodium selenate)—110 mcg
Chromium (as chromium picolinate)—120 mcg
Iron (as ferrous fumarate)—18 mg
MSM/Chondroitin Complex (liposome blend) (50% Methyl-Sulfonyl-Methane, 50% Chondroitin Sulfate)—400 mg
Glucosamine Sulfate (liposome blend)—200 mg
Choline—60 mcg
Boron (as boron citrate)—150 mcg
Inositol (as inositol niacinate)—60 mcg
Other Ingredients: Non-GMO glucose, syrup, sugar, pectin, sunflower lecithin, and purified water. It is free of gluten and gelatin. it contains no yeast, wheat, dairy, eggs, or peanuts, artificial flavors or preservatives.

As shown in FIG. 17, the gummies according the present invention includes an inner portion Ip, and an outer portion Op which surrounds the inner portion Ip. The gummy may include one of more layers disposed between the inner portion Ip and the outer portion Op. The inner portion includes one or more of the dietary supplement compositions, e.g., Curcumin-C, Circumin-C with polymer, Glutasome, Glutasome with polymer and other dietary ingredients. The inner portion Ip includes actives incorporated in the liposomes. The outer portion also includes active ingredients.

The dietary supplement composition is a dispersion including a plurality of liposomal vesicles. The dietary supplement compositions may include one of vitamins A, B1 (thiamine), B2 (riboflavin), B3 (niacin), B5 (pantothenic acid), B6 (pyridoxine), B7 (biotin), B9 (folic acid), B12 (cobalamin), C (ascorbic acid), D, E, and K, and a combination thereof, as an active ingredient. Further, the dietary supplement compositions may include trace minerals, i.e., one of including iron, zinc, iodine, copper, manganese, fluoride, chromium, selenium, molybdenum, and boron, and a combination thereof, as an active ingredient.

The inner portion Ip has a volume of about 1 milliliter which accommodates about 300 mg of the active ingredient. The outer portion Op is formed of edible materials, such as hydrocolloids and includes active ingredients similar to those provided in the inner portion and/or additional active ingredients.

In general, the dietary supplement composition is a dispersion that includes an active ingredient and phospholipid contained in the liposomal vesicles. A coating material such as a polymer may provide free flowing barrier coating to the liposomal vesicles. The active ingredient is incorporated within the liposomal vesicles. The coating material is free flowing in the dispersion such that the liposomal vesicles are surrounded by the coating material without being attached to the liposomal vesicles and without forming part of the liposomal vesicles and without affecting weight of liposomal vesicles. The dispersion is filtered using tangential flow technique which washes out outer periphery of liposomal vesicles so as to remove said inactive ingredient contained outside the liposomal vesicles. However, the tangential flow technique does not wash out the coating material of polymers surrounding the liposomes.

The method of preparing gummies involves (1) preparing a dietary supplement in gel form, which is active ingredient incorporated in the inner portion of the gummy, and (2) incorporating the dietary supplement in pectin, which forms an outer portion of the gummy.

Preparation of the Dietary Supplement Compositions for the Gummies

One of the dietary supplement compositions, e.g., Curcumin-C, Curcumin-C with polymer, Glutasome, Glutasome with polymer, may be used as an active ingredient, if produced in gel form. These dietary supplement compositions may be produced in gel form by eliminating the last step of spray drying. For example, in case Curcumin-C with polymer, eliminating the method step CP 22 of spray drying the aqueous-oil-curcumin mix-first-flavor-gum-second-flavor composition provides Curcumin-C with polymer in gel form which can be used in preparation of gummies.

An illustrative method of dietary supplement including vitamin C in gel form is discussed below with reference to FIGS. 13-15. It may be noted that in the following method vitamin C may be replaced with other one or more of vitamins and/or minerals.

Figure 13:
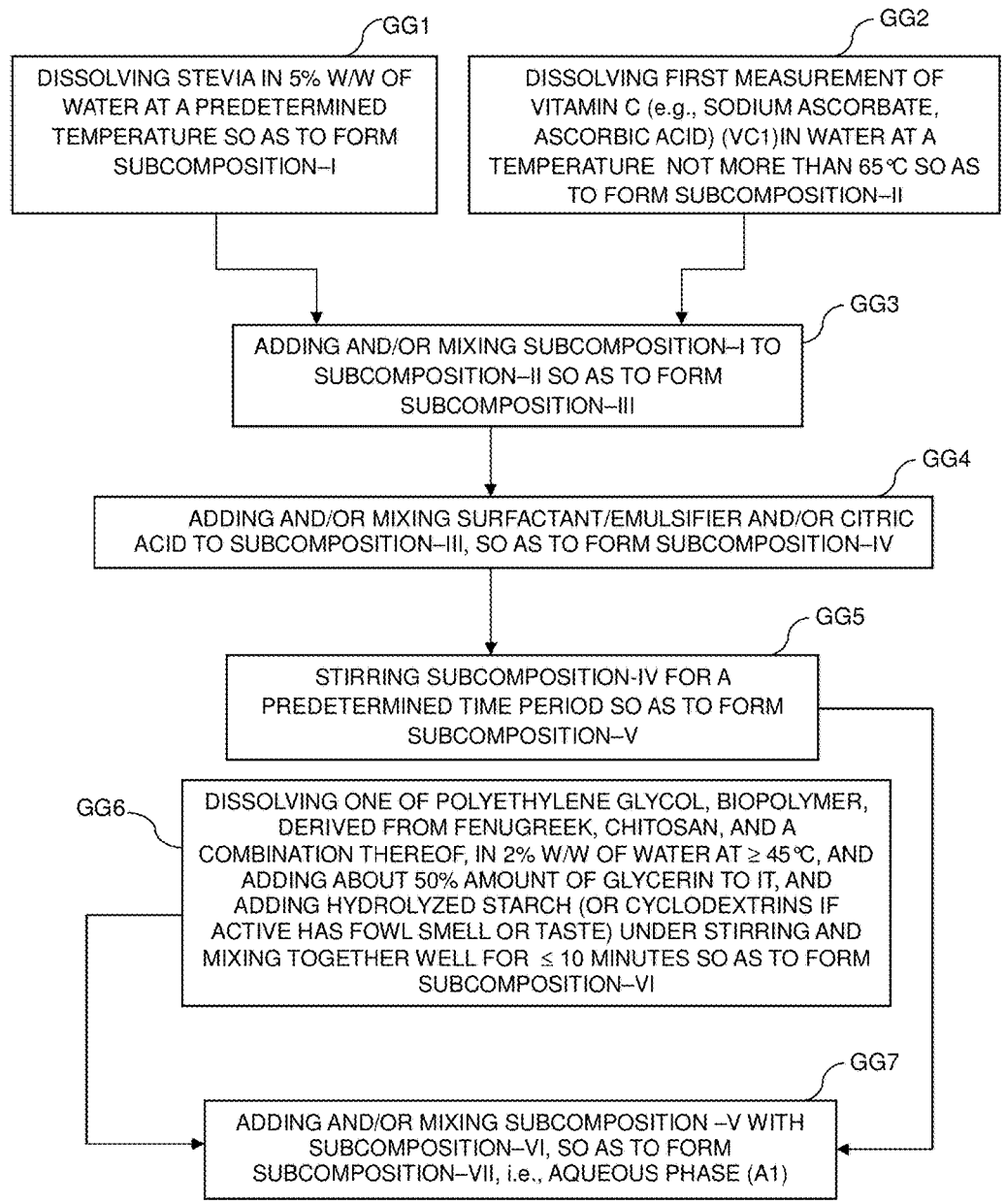
FIG. 13 is a flowchart showing method steps of generating an aqueous phase of dietary supplement composition for gummies according to an illustrative embodiment of the present invention.
Figure 14:
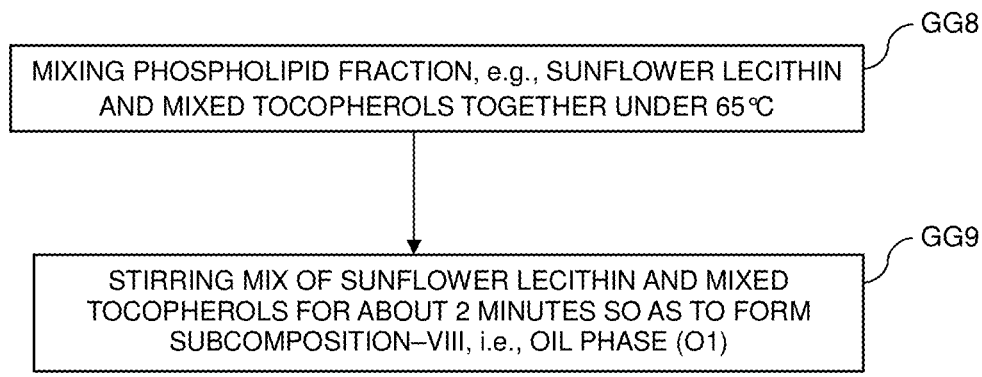
FIG. 14 is a flowchart showing method steps of generating an oil phase of dietary supplement composition for gummies.
Figure 15:
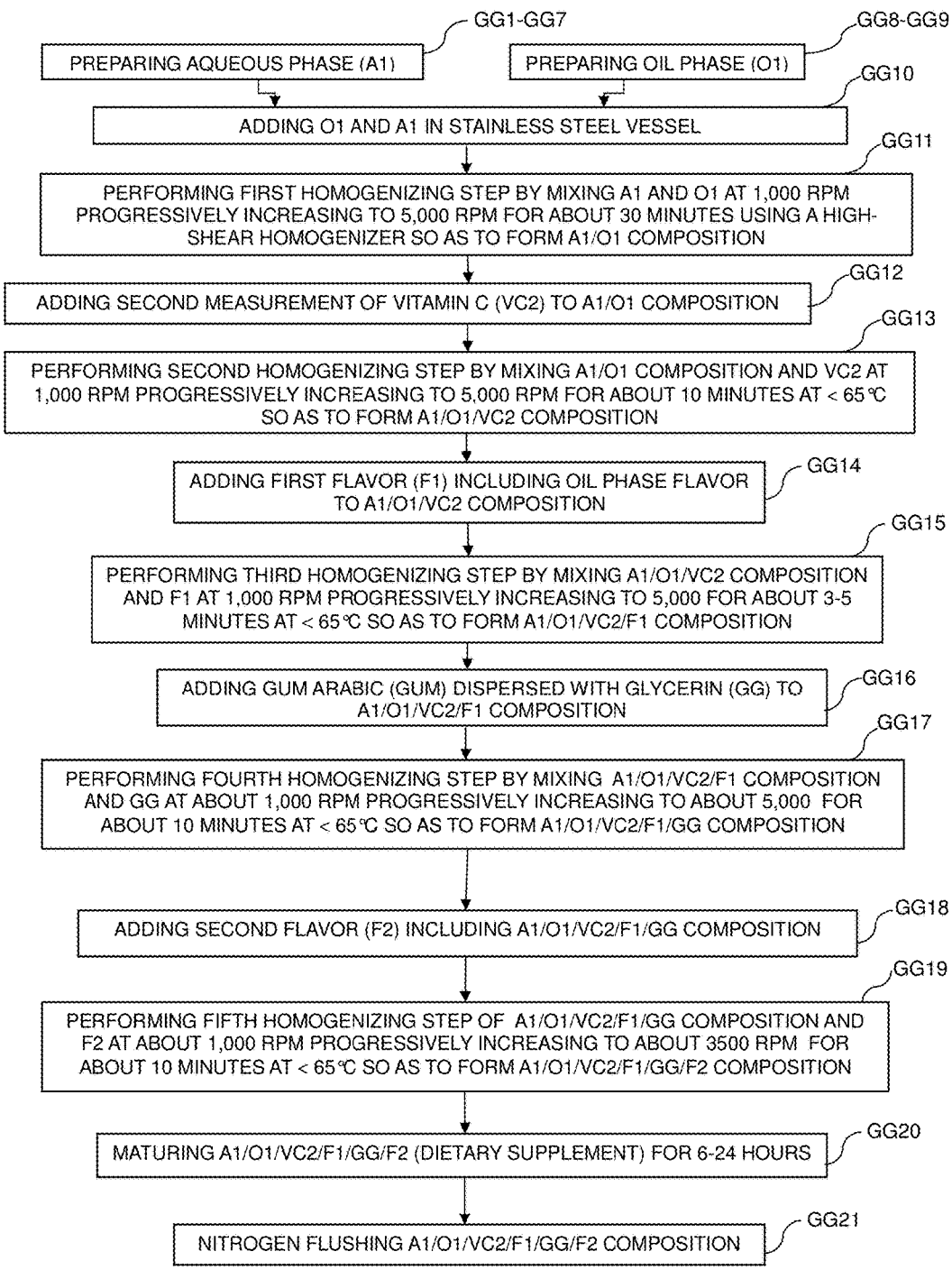
FIG. 15 is flowchart showing steps of preparing dietary supplement composition for gummies.

As shown in FIGS. 13-15, the method of making vitamin C in gel form for gummies includes (1) preparing aqueous phase having a polymer, (2) preparing oil phase with emulsifier, and (3) mixing/homogenizing the aqueous and oil phases.

As shown in FIG. 13, the method steps for generating/preparing an aqueous phase (A1) include STEPS GG1 through GG7. These steps are:

dissolving *stevia* in 5% w/w of hot purified water at about 55° C. based on a total weight of the *stevia*, so as to form Subcomposition-I (STEP GG1), all natural flavors, such as pineapple, orange, lemonade, mango, etc., flavors are incorporated with *stevia*;

dissolving a first measurement of vitamin C (VC1) in sufficient amount of hot purified water at a temperature not more than 65° C., so as of form Subcomposition-II (STEP GG2), the vitamin C may be sodium ascorbate, ascorbic acid or other source;

adding and/or mixing Subcomposition-I to Subcomposition-II, so as to form Subcomposition-III (STEP GG3);

adding and/or mixing surfactant/emulsifier (e.g., TWEEN-80) and/or citric acid to Subcomposition-III, so as to form Subcomposition-IV (STEP GG4); here, the commercial surfactant and emulsifier, e.g., TWEEN 80, is mostly used since the composition for gummies uses a gel based biopolymers;

thereafter, stirring Subcomposition-IV for a predetermined time period, e.g., for 2 minutes, so as to form Subcomposition-V (STEP GG5);

dissolving one of PEG, a biopolymer (such as one derived from fenugreek seeds), chitosan, and a combination thereof in 2% w/w of hot water at not less than 45° C. based on a total weight of the polymer, and adding 50% amount of glycerin to it, and adding cyclodextrin-a and cyclodextrin-c under stirring and mix together well for not more than 10 minutes so as to form Subcomposition-VI (STEP GG6) (as discussed herein, cyclodextrin-a and cyclodextrin-c provide heat shield to vitamin C from pectin (outer portion Op of the gummies G) since it compartmentalize the gummy G); and adding and/or mixing Subcomposition V with Subcomposition-VI, so as to form Subcomposition-VII, i.e., an aqueous phase (STEP GG7).

In this manner, by performing steps GG1 through GG7, an aqueous phase for vitamin C with polymer for gummies is generated.

The cyclodextrin-a and cyclodextrin-c are in an amount equal to 3% of the actual active ingredient by weight.

Further, as shown in FIG. 14, the method steps for generating an Oil Phase with Emulsifier (O1), i.e., Subcomposition-VI, include:—mixing phospholipids/phospholipids fraction (e.g., sunflower lecithin) and mixed tocopherols together under 65° C. (STEP GG8); and—stirring mix of phospholipids/phospholipids fraction and mixed tocopherols for 2 minutes so as to form a Subcomposition-VIII, i.e., an oil phase (STEP GG9). In this manner, by performing steps GG8 and GG9, an oil phase is generated for vitamin C with polymer for gummies.

As shown in FIG. 15, the further steps for preparing a vitamin C with polymer for gummies include:

adding/mixing the Subcomposition-VII (A1) and the Subcomposition-VIII (O1) into in a Stainless Steel vessel (STEP GG10);

performing first homogenizing step by mixing the A1 and the O1 at 1,000 rpm progressively increasing to 5,000 rpm for a first predetermined time period (e.g. 30 minutes) using a high-shear homogenizer, so as to form an A1/O1 composition (Subcomposition-IX) (STEP GG11);

adding and/or mixing a second measurement of vitamin C (VC2) to the A1/O1 composition (STEP GG12), this step is optional depending on whether there is a loss of vitamin C in the previous steps;

performing second homogenizing step by mixing VC2 and the A1/O1 composition for a second predetermined time period (e.g., not less than 10 minutes) at 1,000 rpm progressively increasing to 5,000 rpm at not more than 65° C., so as to form an A1/O1/VC2 composition (Subcomposition-X) (STEP CP13);

adding a first flavor (F1) including an oil phase flavor to the A1/O1/VC2 composition (STEP GG14);

performing third step of homogenizing A1/O1/VC2 composition and the F1 for a third predetermined time period (e.g., 3-5 minutes) at 1,000 rpm progressively increasing to 5,000 rpm at not more than 65° C., so as to form an A1/O1/VC2/F1 composition (Subcomposition-XI) (STEP GG15);

adding one of gum arabic dispersed along with balance quantity of 50% glycerin (GG) to the A1/O1/VC2/F1 composition (STEP GG16);

performing fourth step of homogenizing a final liquid, i.e., mixture of A1/O1/VC2/F1 composition and GG for a fourth predetermined time period (e.g., 10 minutes) at 1,000 rpm progressively increasing to 5,000 rpm at not more than 65° C., so as to form an A1/O1/VC2/F1/GG composition (Subcomposition-XII) (STEP GG17);

adding a second flavor (F2) including an aqueous phase flavor to the A1/O1/VC2/F1/GG composition (STEP GG18); and making up the weight to 100% with purified water under constant stirring, i.e., by performing fifth step of homogenizing by mixing the A1/O1/VC2/F1/GG composition and the F2 for a fifth predetermined time period (e.g., 3-5 minutes) using the high shear homogenizer rotated at 1,000 rpm progressively increasing to 3,500 rpm at not more than 65° C., so as to form an A1/O1/VC2/F1/GG/F2 composition (Subcomposition-XIII) (STEP CP19);

allowing flavors to maturate for 6-24 hours in the A1/O1/VC2/F1/GG/F2 composition, so as to form Subcomposition-XIV (STEP CP20); and subsequently, nitrogen-flushing a final liquid A1/O1/VC2/F1/GG/F2, i.e. the aqueous-oil-vitamin C-first-flavor-gum-second-flavor composition (STEP GG21).

In this manner, dietary supplement composition of vitamin C for gummies is prepared.

It may noted that the vitamin C composition for gummies is gel dispersion in which the vitamin C is incorporated within the liposomal vesicles. The liposomal vesicles are provided with free flowing barrier coating of the polymer. The vitamin C for gummies dispersion may further be processed through membrane filtration procedure called tangential flow for removing smell an any actives that might not have been encapsulated within the spheres of liposomal vesicles. The tangential flow technology does not remove the free flowing barrier coating of polymer formed around the liposomal vesicles. It only removes smell and any actives not been encapsulated within the spheres of liposomal vesicles.

Preparation of Gummies

Figure 16:
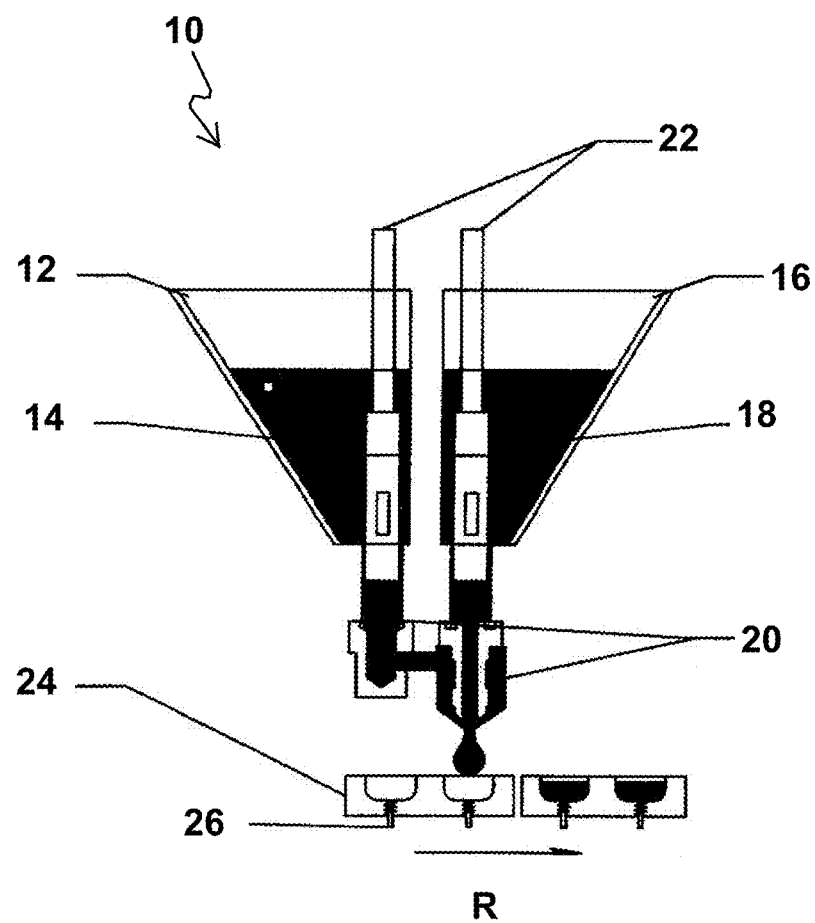
FIG. 16 is a schematic view of a filling apparatus for making gummies and chocolates.

As shown in FIG. 16, a central filling apparatus 10 is used for making gummies. The central filling apparatus 10 includes a shell syrup hopper 12 for receiving and dispensing shell syrup 14 and a central filling hopper 16 for receiving and dispensing central filling material (i.e., dietary supplement composition) 18, a shell syrup strike piston 13 disposed in the shell syrup hopper, a central filling material piston 17 disposed in the central filling hopper 16, a manifold branch and nozzle mechanism 20 for forming gummies, a candy mold 24 arranged at a position below lower portions of the shell syrup hopper 12 and the central filling hopper 16, and a demoulding pin 26 for demoulding the gummies. The mold 24 is aluminum teflon coated. The shell syrup strike piston 13 is configured to dispense shell syrup 14. The central filling material piston 17 is configured to dispense central filing material 18.

The shell syrup (i.e., gummies base material such as pectin derived from fruits) 14 is placed in/supplied to the shell syrup hopper 12. The shell syrup 14 in the shell syrup hopper 12 is at the temperature of 80° C./176° F. The central filling material (e.g., dietary supplement composition, such as vitamin C incorporated in liposomal vesicles, as discussed above) 18 is placed in/supplied to central filling hopper 16, and heated to about 30° C.

The two hoppers 12, 16 work independently of each other. But both masses (base material and dietary supplement composition) 14, 18 end up running through one universal nozzle which has multiple pipe lines.

The cyclodextrin-a and cyclodextrin-c included in the dietary supplement composition act as a heat shield which in turn helps prevent the heat from damaging the active ingredients in the dietary supplement composition when multiple stage processes in manufacturing of finished dietary supplement compositions occur.

The shell syrup material flowing through the shell syrup hopper 12 deposits shell syrup material 14 in the strike piston 13 but at a separate temperature than the temperature of the filling material 18 in the central filling hopper 16. Generally, within 4 minutes of dispending the filling material in the mold 24, the filling material 18 is cooled down to a room temperature as there is an automatic cooling system that the mold runs through. The mold 24 moves in the direction shown by R. Then the material is deposited on a tray and left to cure for 48 hours.

In other words, the manifold branch and nozzle mechanism 20 and in combination with strike pistons 13, 17 deposits shell syrup 14 and filling material 18 in the mould 24 such that the temperature of shell syrup 14 is higher than the temperature of the central filling material 18.

As shown in FIG. 17, the gummies G formed in this manner include an inner portion Ip, and an outer portion Op which surrounds the inner portion. The inner portion Ip includes a dietary supplement composition having a dispersion including a plurality of liposomal vesicles.

As an example, the dietary supplement, which is disposed in the inner portion Ip of the gummy G, includes an active ingredient (e.g., vitamin C), phospholipid contained in the liposomal vesicles; and a coating material. The active ingredient is incorporated within the liposomal vesicles.

Before placing the dietary supplement composition in central filling station, the dietary supplement composition dispersion may be filtered using a tangential flow technique which washes out outer periphery of liposomal vesicles so as to remove said inactive ingredient contained outside the liposomal vesicles. However, it may be noted that, tangential flow does not take out coating material which is free flowing in the dispersion such that the liposomal vesicles remain surrounded by the coating material without being attached to the liposomal vesicles and without forming part of the liposomal vesicles and without affecting weight of liposomal vesicles. The outer portion Op is formed of an edible material such pectin, and includes active ingredients.

The inner portion Ip of the gummy G has a volume of about 1 milliliter which accommodates about 300 mg of the active ingredient, e.g., vitamin C. Other dietary supplement compositions including vitamins such as vitamins A, B1 (thiamine), B2 (riboflavin), B3 (niacin), B5 (pantothenic acid), B6 (pyridoxine), B7 (biotin), B9 (folic acid), B12 (cobalamin), C (ascorbic acid), D, E, and K, and a combination thereof may be incorporated in the inner portion Ip.

Additionally or alternatively, dietary supplement composition including one of trace minerals including iron, zinc, iodine, copper, manganese, fluoride, chromium, selenium, molybdenum, and boron, and a combination thereof may be incorporated in the inner portion Ip.

The volume of the inner portion Ip may be increased or decreased depending on active ingredients. Depending on the size of the gummy, the inner portion may have volume of less than 1 ml, or more than 1 ml, may up to 5 ml. Thus, the inner portion may accommodate up to 1500 mg of active ingredients. However, the preferable size is up to 1 ml which accommodates up to 300 mg of active ingredients.

The outer portion Op may be made of any edible material including hydrocolloids. A nutrient pre-mix, e.g., vitamin pre-mix can be added into the outer portion Op. Thus, the outer portion Op may include active ingredients.

It may be noted that by doing a core based product filling, i.e., creating inner including dietary supplement, less material is lost so that 7-12% overage on the actives can be achieved.

Chocolates

Chocolates having inner portion including a dietary supplement and the outer portion having cocoa and/or chocolate forming material may be prepared in a manner similar to preparing gummies. In the chocolate preparation, the mold is changed from aluminum teflon coated to plastic coasted and the temperature of shell syrup (chocolate syrup) in shell syrup hopper is decreased from 80° C. to 35° C.

Atomizers/Sprayers

Atomizers/sprayers are devices used for emitting liquids as a fine spray. The dietary supplement compositions discussed herein are included in the liquid put in atomizers. The liquid can be directly sprayed in mouth.

Powders

The dietary supplement composition can be dried to powder and stored at room temperature. The liposomes in powder do not degrade at room temperature. The powder when mixed with water reconstitutes liposomes.

Characteristics of Dietary Supplement Compositions

The methods of making dietary supplement compositions described herein include isolation processes for dealing with extreme temperature to prevent degradation of active compounds as well as for masking taste and odor. Utilizing a process that incorporates two varieties of cyclodextrin-a and cyclodextrin-c with gum arabic, the finished material is agglomerated free of preservatives. This allows the dietary supplement compositions to be both water dispersible and preservative free. The cyclodextrin-a and cyclodextrin-c—equivalent to 3% of the total molecular weight of the active solution—are added during preparation of the aqueous phase. The addition of cyclodextrin-a and cyclodextrin-c with gum arabic aids in converting liquid phase to microcrystalline or amorphous powders.

By adding cyclodextrin-a and cyclodextrin-c, an active like reduced glutathione (GSH) that has volatile taste and smell can be encapsulated to reduce organoleptic sensitivity of the active ingredient. This process allows for the concentration of actives to be placed into smaller spaces without traditional sensory obstacles associated with taste or smell. For example, as much as 300 mg of an active, i.e., Vitamin C, may be applied in a space equivalent to 1 ml in volume. This allows actives that have liposome encapsulation to be concentrate within small spaces such as gummies and chocolates for the delivery of vitamins and minerals. By incorporating the cyclodextrin-a and cyclodextrin-c in aqueous phase, water disposable liposomal actives without negative taste or smell properties traditionally found with actives and nutrients that have highly undesirable organoleptic properties can be created.

Because they are capable of reversible inclusion of other substances, cyclodextrin-a and cyclodextrin-c can also be used for modifying the properties of compounds: for example, masking the taste or odor of active ingredients found within a nutraceutical compound. Per the number of glucose units, a distinction is made between cyclodextrin-a and cyclodextrin-b and cyclodextrin-c: cyclodextrin-a consists of six, cyclodextrin-b of seven and cyclodextrin-c of eight glucose units. The cyclodextrin molecules are structured so that the hydrophilic (water-loving) glucose building blocks face outwards and there is a lipophilic cavity (i.e. one with an affinity for fat) on the inside. This cavity can receive another lipophilic molecule as a "guest," provided it is of the appropriate size and shape. Cavity size is the major determinant as to which cyclodextrin is used in complexation. "Fit" is critical to achieving good incorporation of cyclodextrins. The liposome base material can be concentrated and fit into small areas like gummies and without flavor or smell negatively impacting the actual taste of the finished product. The base material can also be put into water based solution free of preservatives i.e., like a powdered drink mix version.

The methods discussed herein provide the compositions which are non-GMO, vegetarian and liposome powered. The compositions do not include artificial flavoring, artificial coloring and artificial preservatives. In other words, the compositions do not include non-GMO ingredients, are vegetarian, are liposome powered, contain no artificial flavoring, contain no artificial coloring and contain no artificial preservatives.

According to the method described herein one or more flavors in addition to the active ingredients can be encapsulated inside the liposomes/liposomal vesicles so when the liposomal vesicles brake the flavors are released at the same time the actives are freed from within the liposomes. Further, the dietary supplement compositions discussed herein may be put into small spray atomizers where 15 ml footprint can release 30 doses of product in high yields without taste and smell being unpleasant.

Further, the dietary supplement compositions discussed herein may be put into gummies, chocolates, capsules, tablets, atomizers and powders.

The present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A method of preparing a dietary supplement composition, said method comprising the steps of:
   generating an aqueous phase (A1);
   the method step of the generating the aqueous phase comprises
   dissolving *stevia* in 5% w/w of hot purified water at a temperature of about 55° C. based on total weight of the *stevia* as to form Subcomposition-I;
   dissolving a first measurement of a dietary supplement nutrient (DSN1) in hot purified water at a temperature not more than 65° C. so as to form Subcomposition-II;

adding and mixing said Subcomposition-I to said Subcomposition-II so as to form Subcomposition-III;

adding and mixing a citric acid to said Subcomposition-III so as to form Subcomposition-IV;

stirring said Subcomposition-IV for a time period of about 2 minutes, so as to form Subcomposition-V;

dissolving a polymer comprising a combination of polyethylene glycol (PEG) and chitosan in about 2% w/w of hot water at a temperature not less than of 45° C. based on total weight of the polymer, and adding about 50% amount of glycerin by weight thereto, and adding one of hydrogenated glucose, hydrolyzed starch and cyclodextrins under stirring and mixing conditions together for a time period of not more than 10 minutes so as to form Subcomposition-VI; and mixing said Subcomposition V and said Subcomposition-VI so as to form said aqueous phase;

generating an oil phase (O1); said oil phase comprising phospholipid and tocopherol;

adding said aqueous phase and said oil phase in a vessel;

performing a first homogenizing step by mixing said A1 and said O1 using a high shear homogenizer operated at progressively increasing speeds from about 1000 rpm to about 5000 rpm for time period of about 30 minutes so as to form an aqueous-oil (A1/O1) composition having a plurality of liposomal vesicles of said phospholipid, said liposomal vesicles having DSN1 incorporated therein;

adding a second measurement of the dietary supplement nutrient (DSN2) to said A1/O1 composition; and performing a second homogenizing step by mixing said A1/O1 composition and said DSN2 using said high shear homogenizer operated at progressively increasing speeds from about 1000 rpm to about 5000 rpm for time period of about 10 minutes so as to form an aqueous-oil-dietary-supplement-nutrient (A1/O1/DSN2) composition, said A1/O1/DSN2 composition having a physical barrier coating of said polymer including a combination of the PEG and the chitosan linearly formed around said liposomal vesicles without being attached to said liposomal vesicles and without forming part of said liposomal vesicles.

2. A method of preparing a dietary supplement composition according to claim 1, further comprising the steps of adding a first oil-phase flavor (F1) ingredient to said A1/O1/DNS2 composition; and performing a third homogenizing step by mixing said A1/O1/DNS2 composition and said F1 ingredient by using said high shear homogenizer operated at progressively increasing speeds from about 1000 rpm to about 5000 rpm for a time period about 3-5 minutes so as to form an aqueous-oil-dietary-supplement-nutrient-first-flavor (A1/O1/DNS2/F1) composition.

3. A method of preparing a dietary supplement composition according to claim 2, further comprising the steps of adding gum arabic dispersed with glycerin (GG) to said A1/O1/DSN2/F1 composition; and performing a fourth homogenizing step by mixing said A1/O1/DSN2/F1 composition and said GG using said high shear homogenizer operated at progressively increasing speed from 1000 rpm to about 5000 rpm for a time period of about 10 minutes so as to form an aqueous-oil-dietary-supplement-nutrient-first-flavor-gum (A1/O1/DSN2/F1/GG) composition.

4. A method of preparing a dietary supplement composition according to claim 3, further comprising the steps of adding a second aqueous-phase flavor (F2) ingredient to said A1/O1/DSN2/F1/GG composition; and performing a fifth homogenizing step by mixing said A1/O1/DSN2/F1/GG and said F2 ingredient by using said high shear homogenizer operated at progressively increasing speeds from 1000 rpm to about 5000 rpm for a time period of about 3-5 minutes so as to form an aqueous-oil-dietary-supplement-nutrient-first-flavor-gum-second-flavor (A1/O1/DSN2/F1/GG/F2) composition.

5. A method of preparing a dietary supplement composition according to claim 4, further comprising the step of filtering said A1/O1/DSN2/F1/GG/F2 composition using a tangential flow technique.

6. A method of preparing a dietary supplement composition according to claim 1, wherein said dietary supplement nutrient comprises curcumin mix which includes curcumin, piperic acid, sodium ascorbate, and ascorbic acid blend having citrus bioflavanols.

7. A method of preparing a dietary supplement composition according to claim 1, wherein said dietary supplement nutrient comprises a combination of curcumin and vitamin C (ascorbic acid).

8. A method of preparing a dietary supplement composition, said method comprising the steps of:

generating an aqueous phase (A1);

the method step of the generating the aqueous phase comprises dissolving *stevia* in 5% w/w of hot purified water at a temperature of about 55° C. based on total weight of the *stevia* as to form Subcomposition-I;

dissolving a first measurement of a dietary supplement nutrient (DSN1) in hot purified water at a temperature not more than 65° C. so as to form Subcomposition-II;

adding and mixing said Subcomposition-I to said Subcomposition-II so as to form Subcomposition-III;

adding and mixing a citric acid to said Subcomposition-III so as to form Subcomposition-IV;

stirring said Subcomposition-IV for a time period of about 2 minutes, so as to form Subcomposition-V;

dissolving a surrounding material comprising a combination of polyethylene glycol (PEG) and chitosan in about 2% w/w of hot water at a temperature not less than of 45° C. so as to form Subcomposition-VI; and mixing said Subcomposition V and said Subcomposition-VI so as to form said aqueous phase;

generating an oil phase (O1); said oil phase comprising phospholipid and tocopherol;

adding said aqueous phase and said oil phase in a vessel;

performing a first homogenizing step by mixing said A1 and said O1 using a high shear homogenizer operated at progressively increasing speeds from about 1000 rpm to about 5000 rpm for time period of about 30 minutes so as to form an aqueous-oil (A1/O1) composition having a plurality of liposomal vesicles of said phospholipid, said liposomal vesicles having DSN1 incorporated therein;

adding a second measurement of the dietary supplement nutrient (DSN2) to said A1/O1 composition; and performing a second homogenizing step by mixing said A1/O1 composition and said DSN2 using said high shear homogenizer operated at progressively increasing speeds from about 1000 rpm to about 5000 rpm for time period of about 10 minutes so as to form an aqueous-oil-dietary-supplement-nutrient (A1/O1/DSN2) composition, said A1/O1/DSN2 composition having a physical barrier coating of said surrounding material including the PEG and the chitosan formed in a linear manner around said liposomal vesicles without being attached to said liposomal vesicles and without forming a part of said liposomal vesicles.

9. A method of preparing a dietary supplement composition according to claim 8, further comprising the steps of
adding a first oil-phase flavor (F1) ingredient to said A1/O1/DNS2 composition; and
performing a third homogenizing step by mixing said A1/O1/DNS2 composition and said F1 ingredient by using said high shear homogenizer operated at progressively increasing speeds from about 1000 rpm to about 5000 rpm for a time period about 3-5 minutes so as to form an aqueous-oil-dietary-supplement-nutrient-first-flavor (A1/O1/DNS2/F1) composition.

10. A method of preparing a dietary supplement composition according to claim 9, further comprising the steps of
adding gum arabic dispersed with glycerin (GG) to said A1/O1/DSN2/F1 composition, wherein said gum arabic dispersed with glycerin is separate from said glycerin of the aqueous phase; and
performing a fourth homogenizing step by mixing said A1/O1/DSN2/F1 composition and said GG using said high shear homogenizer operated at progressively increasing speed from 1000 rpm to about 5000 rpm for a time period of about 10 minutes so as to form an aqueous-oil-dietary-supplement-nutrient-first-flavor-gum (A1/O1/GSH2/F1/GG) composition.

11. A method of preparing a dietary supplement composition according to claim 10, further comprising the steps of
adding a second aqueous-phase flavor (F2) ingredient to said A1/O1/DSN2/F1/GG composition; and
performing a fifth homogenizing step by mixing said A1/O1/DSN2/F1/GG and said F2 ingredient by using said high shear homogenizer operated at progressively increasing speeds from 1000 rpm to about 5000 rpm for a time period of about 3-5 minutes so as to form an aqueous-oil-dietary-supplement-nutrient-first-flavor-gum-second-flavor (A1/O1/DSN2/F1/GG/F2) composition.

12. A method of preparing a dietary supplement composition according to claim 8, wherein said dietary supplement nutrient comprises curcumin mix which includes curcumin, piperic acid, sodium ascorbate, and ascorbic acid blend having citrus bioflavonals.

13. A method of preparing a dietary supplement composition according to claim 8, wherein said dietary supplement nutrient comprises curcumin and vitamin C (ascorbic acid).

14. A method of preparing a dietary supplement composition according to claim 6, wherein said curcumin is in the amount of about 250 mg and the piperic acid is in the amount of about 3 mg.

* * * * *